(12) United States Patent
Firpo et al.

(10) Patent No.: US 11,640,759 B1
(45) Date of Patent: *May 2, 2023

(54) SYSTEM AND METHOD FOR ADAPTING WORKFLOWS BASED ON TIME TO RESPOND

(71) Applicant: MOTOROLA SOLUTIONS, INC., Chicago, IL (US)

(72) Inventors: Isabel Firpo, Chicago, IL (US); Jonathan Whitall, Naperville, IL (US); Phyllis C Austin, Weston, FL (US); Amruthavarshini Hiriyur Krishnamurthy, Bangalore (IN); Kylene Tanner, Bountiful, UT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,041

(22) Filed: Dec. 1, 2021

(51) Int. Cl.
*G08B 26/00* (2006.01)

(52) U.S. Cl.
CPC .................................. *G08B 26/001* (2013.01)

(58) Field of Classification Search
CPC ... G06Q 20/405; H04L 67/62; H04L 63/1433; G06F 2201/81; G06F 9/542; G06F 11/3055
See application file for complete search history.

(56) References Cited

U.S. PATENT DOCUMENTS

| | | | |
|---|---|---|---|
| 7,865,498 B2 | 1/2011 | Rodriguez | |
| 8,971,850 B2 | 3/2015 | Klein et al. | |
| 9,226,124 B2 | 12/2015 | Schuler et al. | |
| 9,232,362 B2 | 1/2016 | Bekiares et al. | |
| 10,521,280 B2 | 12/2019 | Zhang et al. | |
| 10,558,936 B2 | 2/2020 | Herman et al. | |
| 10,867,460 B1 | 12/2020 | Proctor | |
| 2009/0049108 A1 | 2/2009 | Forde et al. | |
| 2012/0116836 A1 | 5/2012 | Flores et al. | |
| 2014/0282046 A1* | 9/2014 | Gonsalves | G06F 11/079 715/740 |

(Continued)

OTHER PUBLICATIONS

Tian, Yong et al.: "Device, System and Method for Modifying Electronic Workflows", Application Serial No. PCT/CN2020/115664, filed: Sep. 16, 2020, all pages.

(Continued)

*Primary Examiner* — Mirza F Alam

(57) ABSTRACT

Techniques for adapting workflows based on time to respond are provided. An electronic indication that a trigger has been detected by a sensor is received. The workflow server is configured to execute an action in a workflow in response to the trigger. An alert is sent to a device associated with a user to request a response from the user. Reception of the response is the action in the workflow. The response from the user is received. It is detected that a current response time for the trigger exceeds a threshold response time. A pattern that indicates response times for triggers of the trigger type recurrently exceed the threshold response time is detected. A proposed modification to the workflow or to a standard operating procedure (SOP) of an entity is generated. An electronic message is sent to a system administrator that recommends implementing the proposed modification.

20 Claims, 16 Drawing Sheets

(56) References Cited

U.S. PATENT DOCUMENTS

| | | | |
|---|---|---|---|
| 2014/0304027 A1* | 10/2014 | Wu | G06Q 10/0633 |
| | | | 705/7.27 |
| 2015/0058219 A1* | 2/2015 | Grossman | G06Q 20/407 |
| | | | 705/44 |
| 2015/0163121 A1 | 6/2015 | Mahaffey et al. | |
| 2018/0054719 A1 | 2/2018 | Lis et al. | |
| 2020/0004957 A1 | 1/2020 | Chamaraju et al. | |
| 2020/0137097 A1 | 4/2020 | Zimmermann et al. | |
| 2020/0213241 A1* | 7/2020 | Dhanabalan | H04L 47/28 |
| 2020/0329348 A1 | 10/2020 | Halun et al. | |
| 2021/0081298 A1* | 3/2021 | Gardner | G06F 11/3419 |
| 2021/0182084 A1 | 6/2021 | Fariss et al. | |

OTHER PUBLICATIONS

The International Search Report and the Written Opinion, corresponding patent application No. PCT/US2022/050080 filed Nov. 16, 2022, dated Mar. 15, 2023, all pages.

* cited by examiner

SYSTEM AND METHOD FOR ADAPTING WORKFLOWS BASED ON TIME TO RESPOND

BACKGROUND

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system will have to be configured to provide the notifications to the radios and the video security system will have to be configured to provide the notifications to the radios. Thus, both the access control system and the video security system will need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem will be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool equips administrators with the capabilities they need to detect triggers across a number of installed devices/systems and quickly take actions (execute workflows) to reduce the risk of breaches and downtime by automatically alerting the appropriate teams and executing the proper procedures.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1A:
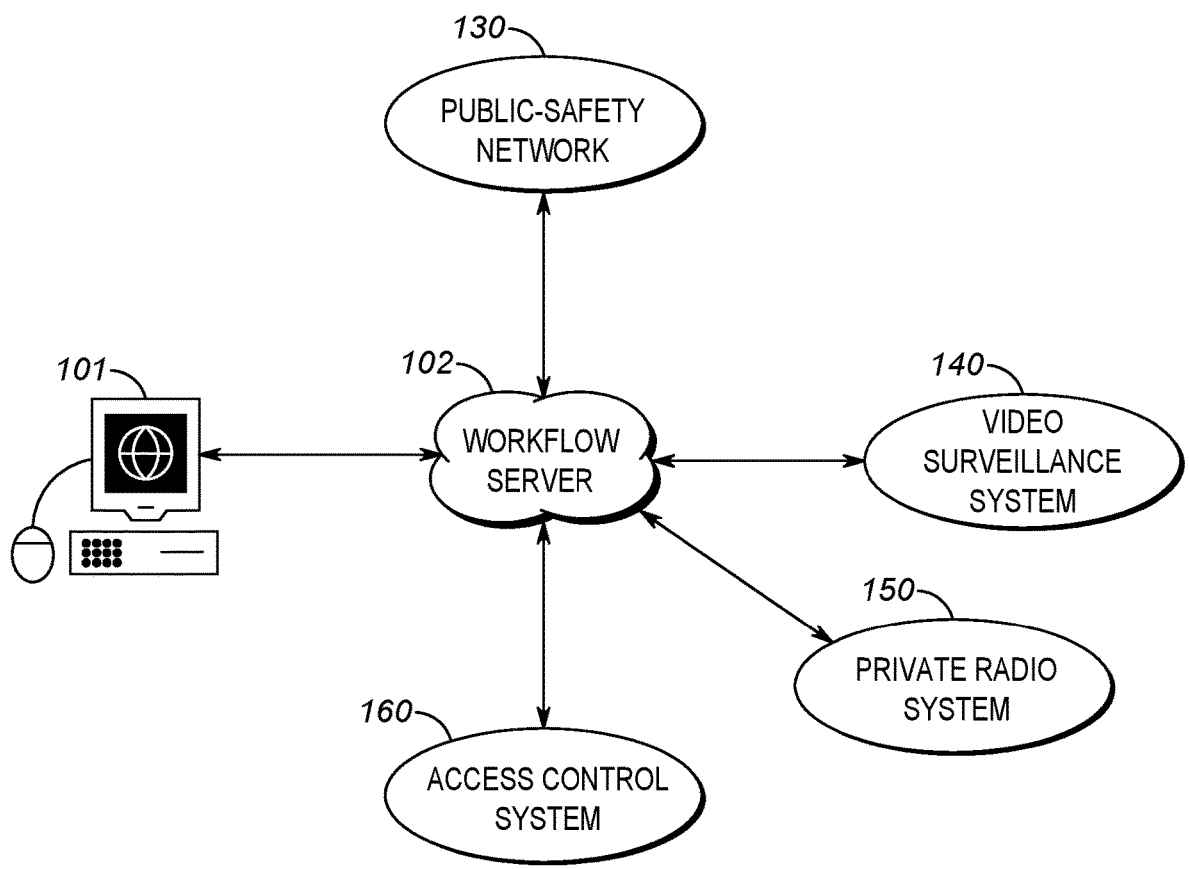
FIG. 1a illustrates a security ecosystem capable of configuring and automating workflows.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a system, method, and apparatus for implementing workflows across multiple differing systems and devices is provided herein. A workflow server is provided that allows a system administrator to abstract the configuration of each system. For example, the two situations described above (e.g. door breach, loitering) are each represented in the workflow server as a trigger. There is no need to initially define or integrate what happens when either of those triggers is received. Instead, the workflow server can be notified when either of those triggers occurs. Typically, triggers are received from some sort of sensor connected to the workflow server (e.g. door open sensor, video analytics to detect loitering, etc.).

Likewise, the outputs (e.g. notify radios) can be represented in the workflow server as actions. The actions can be any type of output from the system (e.g. notify radios, lock doors, open door, sound fire alarm, etc.). Actions are defined independent of triggers and triggers are defined independent of actions. When configuring the system, the administrator may simply drag an action item into the workspace. The administrator may then drag an action into the workspace. The two items can then be connected (e.g. using a graphical user interface to draw a line between the trigger and the action in the workspace, etc.). It should be noted that the system responsible for the trigger (e.g. access control system sensing door open, etc.) and the system responsible for initiating the action (e.g. radio system for notification) need not be configured to communicate with each other. Instead, a trigger is received by a workflow server and based on the defined workflow the workflow server initiates the action. In other words, the workflow allows each system to operate with other systems, without each system having to be specifically configured to operate with the other systems.

FIGS. 1-6 describe a workflow server system that may be utilize the techniques described herein.

A problem arises in that a system administrator may not initially be aware of various constraints involved when setting up a workflow. For example, in the case where a door open trigger causes a radio alert action to be sent to a security guard to investigate, there may be a timeout parameter that causes an escalation to occur if the action is not completed before the timeout occurs. The escalation may be that an escalation workflow is initiated. For example, the escalation workflow may cause the building to go into lock down because it is not known if anyone has entered the building. Incorrectly setting the timeout value may cause unnecessary building lockdowns if the timeout value is routinely exceeded. At the time of workflow creation, the system administrator may not know the proper value to use as the timeout parameter and may simply make an educated, or possibly random, guess as to what value to use.

The techniques described herein solve these problems individually and collectively. Once the system administrator has completed a workflow, the workflow may be deployed. Whenever the workflow is initiated (e.g. a trigger is received that cause an action to be executed, etc.) the system monitors the response time and detects if the response time for the action exceeded the timeout value (e.g. a threshold response time). The system may then compare this instance of exceeding the defined response time with response times for previous executions of this workflow to detect patterns of response times that recurrently exceed the threshold response time, meaning it is quite likely the response time threshold is set incorrectly. In response to detecting such a pattern, a proposed modification to the workflow or standard operating procedure is generated. A message may be sent to the system administrator to recommend implementing the proposed modification. In some cases, a response exceeding a threshold is an anomaly, or a one-off occurrence. In such cases, the responder may indicate that the abnormal response time was due to a known issue, rather than being part of a chronic failure. If so indicated, the abnormal response time may be excluded from the analysis to determine if exceeding the response time threshold is a recurrent occurrence.

A method is provided. The method includes receiving, at a workflow server connected to a network, an electronic indication that a trigger having a trigger type has been detected by a sensor connected to the network, wherein the workflow server is configured to execute an action in a workflow in response to the trigger. The method also includes sending, via the network, an alert to a device associated with a user to request a response from the user, wherein reception of the response is the action in the workflow. The method also includes receiving, via the network from the device, the response from the user. The method also includes detecting that a current response time for the trigger exceeds a threshold response time for the action, wherein the current response time is an amount of time that elapsed between detection of the trigger and receiving the response from the user. The method also includes detecting, based on the current response time and based on previous response times for previous triggers of the trigger type, a pattern that indicates response times for triggers of the trigger type recurrently exceed the threshold response time. The method also includes in response to detecting the pattern, generating a proposed modification to the workflow or to a standard operating procedure (SOP) of an entity for whom the workflow is effectuated. The method also includes sending, to a system administrator via the network, an electronic message that recommends implementing the proposed modification to effect a change in the pattern.

In one aspect, the method further comprises receiving, from the user, an indication that the current response time exceeding the threshold is an anomaly and skipping the steps of detecting the pattern, generating the proposed modification, and sending the electronic message. In one aspect, the method further comprises providing a dashboard for review by the system administrator, the dashboard including the detected pattern and the anomaly indications, wherein the dashboard provides links to allow the system administrator to view the previous response times.

In one aspect, generating the proposed modification further comprises identifying a similar pattern in a different workflow. In one aspect, generating the proposed modification further comprises identifying a similar pattern from a different user. In one aspect, generating the proposed modification further comprises identifying a similar pattern from a different entity's workflow. In one aspect, the method further comprises receiving an acknowledgement of the proposed modification from the system administrator and implementing the proposed modification in the workflow.

A system is provided. The system includes a processor and a memory coupled to the processor. The memory contains a set of instructions thereon that when executed by the processor cause the processor to receive, at a workflow server connected to a network, an electronic indication that a trigger having a trigger type has been detected by a sensor connected to the network, wherein the workflow server is configured to execute an action in a workflow in response to the trigger. The instructions further cause the processor to send, via the network, an alert to a device associated with a user to request a response from the user, wherein reception of the response is the action in the workflow. The instructions further cause the processor to receive, via the network from the device, the response from the user. The instructions further cause the processor to detect that a current response time for the trigger exceeds a threshold response time for the action, wherein the current response time is an amount of time that elapsed between detection of the trigger and receiving the response from the user. The instructions further cause the processor to detect, based on the current response time and based on previous response times for previous triggers of the trigger type, a pattern that indicates response times for triggers of the trigger type recurrently exceed the threshold response time. The instructions further cause the processor to in response to detecting the pattern, generate a proposed modification to the workflow or to a standard operating procedure (SOP) of an entity for whom the workflow is effectuated. The instructions further cause the processor to send, to a system administrator via the network, an electronic message that recommends implementing the proposed modification to effect a change in the pattern.

In one aspect, the instructions further cause the processor to receive, from the user, an indication that the current response time exceeding the threshold is an anomaly and skip the steps of detecting the pattern, generating the proposed modification, and sending the electronic message. In one aspect, the instructions further cause the processor to provide a dashboard for review by the system administrator, the dashboard including the detected pattern and the anomaly indications, wherein the dashboard provides links to allow the system administrator to view the previous response times.

In one aspect, the instructions to generate the proposed modification further comprises instructions to identify a similar pattern in a different workflow. In one aspect, the instructions to generate the proposed modification further comprises instructions to identify a similar pattern from a different user. In one aspect, the instructions to generate the proposed modification further comprises instructions to identify a similar pattern from a different entity's workflow. In one aspect the instructions further cause the processor to receive an acknowledgement of the proposed modification from the system administrator and implement the proposed modification in the workflow.

A non-transitory processor readable medium is provided. The medium contains a set of instructions thereon that when executed by a processor cause the processor to receive, at a workflow server connected to a network, an electronic indication that a trigger having a trigger type has been detected by a sensor connected to the network, wherein the workflow server is configured to execute an action in a workflow in response to the trigger. The instructions on the medium further cause the processor to send, via the network, an alert to a device associated with a user to request a response from the user, wherein reception of the response is the action in the workflow. The instructions on the medium further cause the processor to receive, via the network from the device, the response from the user. The instructions on the medium further cause the processor to detect that a current response time for the trigger exceeds a threshold response time for the action, wherein the current response time is an amount of time that elapsed between detection of the trigger and receiving the response from the user. The instructions on the medium further cause the processor to detect, based on the current response time and based on previous response times for previous triggers of the trigger type, a pattern that indicates response times for triggers of the trigger type recurrently exceed the threshold response time. The instructions on the medium further cause the processor to in response to detecting the pattern, generate a proposed modification to the workflow or to a standard operating procedure (SOP) of an entity for whom the workflow is effectuated. The instructions on the medium further cause the processor to send, to a system administrator via the network, an electronic message that recommends implementing the proposed modification to effect a change in the pattern.

In one aspect, the instructions on the medium further cause the processor to receive, from the user, an indication that the current response time exceeding the threshold is an anomaly and skip the steps of detecting the pattern, generating the proposed modification, and sending the electronic message. In one aspect, the instructions on the medium further cause the processor to provide a dashboard for review by the system administrator, the dashboard including the detected pattern and the anomaly indications, wherein the dashboard provides links to allow the system administrator to view the previous response times.

In one aspect, the instructions on the medium to generate the proposed modification further comprises instructions to identify a similar pattern in a different workflow. In one aspect, the instructions on the medium to generate the proposed modification further comprises instructions to identify a similar pattern from a different user. In one aspect, the instructions on the medium to generate the proposed modification further comprises instructions to identify a similar pattern from a different entity's workflow. In one aspect the instructions on the medium further cause the processor to receive an acknowledgement of the proposed modification from the system administrator and implement the proposed modification in the workflow.

Turning now to the drawings, wherein like numerals designate like components, FIG. 1a illustrates security ecosystem 100 capable of configuring and automating workflows across multiple systems. As shown, security ecosystem 100 comprises public-safety network 130, video surveillance system 140, private radio system 150, and access control system 160. Workflow server 102 is coupled to each system 130, 140, 150, and 160. Workstation 101 is shown coupled to workflow server 102, and is utilized to configure server 102 with workflows created by a user. It should be noted that although the components in FIG. 1 are shown geographically separated, these components can exist within a same geographic area, such as, but not limited to a school, a hospital, an airport, a sporting event, a stadium, . . . , etc. It should also be noted that although only networks and systems 130-160 are shown in FIG. 1a, one of ordinary skill in the art will recognize that many more networks and systems may be included in ecosystem 100.

Workstation 101 is preferably a computer configured to execute Motorola Solution's Orchestrate™ and Ally™ dispatch and incident management software. As will be discussed in more detail below, workstation 101 is configured to present a user with a plurality of triggers capable of being detected by network and systems 130-160 as well as present the user with a plurality of actions capable of being executed by network and systems 130-160. The user will be able to create workflows and upload these workflows to workflow server 102 based on the presented triggers and actions.

Workflow server 102 is preferably a server running Motorola Solution's Command Central™ software suite comprising the Orchestrate™ platform. Workflow server 102 is configured to receive workflows created by workstation 101 and implement the workflows. Particularly, the workflows are implemented by analyzing events detected by network and systems 130-160 and executing appropriate triggers. For example, assume a user creates a workflow on workstation 101 that has a trigger comprising surveillance system 140 detecting a loitering event, and has an action comprising notifying radios within public-safety network 130. When this workflow is uploaded to workflow server 102, workflow server 102 will notify the radios of any loitering event detected by surveillance system 140.

Public-safety network 130 is configured to detect various triggers and report the detected triggers to workflow server 102. Public-safety network 130 is also configured to receive action commands from workflow server 102 and execute the actions. In one embodiment of the present invention, public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from workflow server 102.

Video surveillance system 140 is configured to detect various triggers and report the detected triggers to workflow server 102. Public-safety network 130 is also configured to receive action commands from workflow server 102 and execute the actions. In one embodiment of the present invention, video surveillance system 140 comprises a plurality of video cameras that may be configured to automatically change their field of views over time. Video surveillance system 140 is configured with a recognition engine/video analysis engine (VAE) that comprises a software engine that analyzes any video captured by the cameras. Using the VAE, the video surveillance system 140 is capable of "watching" video to detect any triggers and report the detected triggers to workflow server 102. In a similar manner, video surveillance system 140 is configured to execute action commands received from workflow server 102. In one embodiment of the present invention, video surveillance system 140 comprises an Avigilon™ Control Center (ACC) server having Motorola Solution's Access Control Management (ACM)™ software suite.

Radio system 150 preferably comprises a private enterprise radio system that is configured to detect various triggers and report the detected triggers to workflow server 102. Radio system 150 is also configured to receive action commands from workflow server 102 and execute the actions. In one embodiment of the present invention, radio system 150 comprises a MOTOBRO™ communication system having radio devices that operate in the CBRS spectrum and combines broadband data with voice communications.

Finally, access control system 160 comprises an IoT network. IoT system 160 serves to connect every-day devices to the Internet. Devices such as cars, kitchen appliances, medical devices, sensors, doors, windows, HVAC systems, drones, . . . , etc. can all be connected through the IoT. Basically, anything that can be powered can be connected to the internet to control its functionality. System 160 allows objects to be sensed or controlled remotely across existing network infrastructure. For example, access control system 160 may be configured to provide access control to various doors and windows. With this in mind, access control system 160 is configured to detect various triggers (e.g., door opened/closed) and report the detected triggers to workflow server 102. Access control system 160 is also configured to receive action commands from workflow server 102 and execute the action received from workflow server 102. The action commands may take the form of instructions to lock, open, and/or close a door or window.

As is evident, the above security ecosystem 100 allows an administrator using workstation 101 to create rule-based, automated workflows between technologies to enhance efficiency, and improve response times, effectiveness, and overall safety. The above ecosystem 100 has the capability to detect triggers across a number of devices within network and systems 130-160 quickly take actions by automatically executing the proper procedure (i.e., executing the appropriate action once a trigger is detected).

Figure 1B:
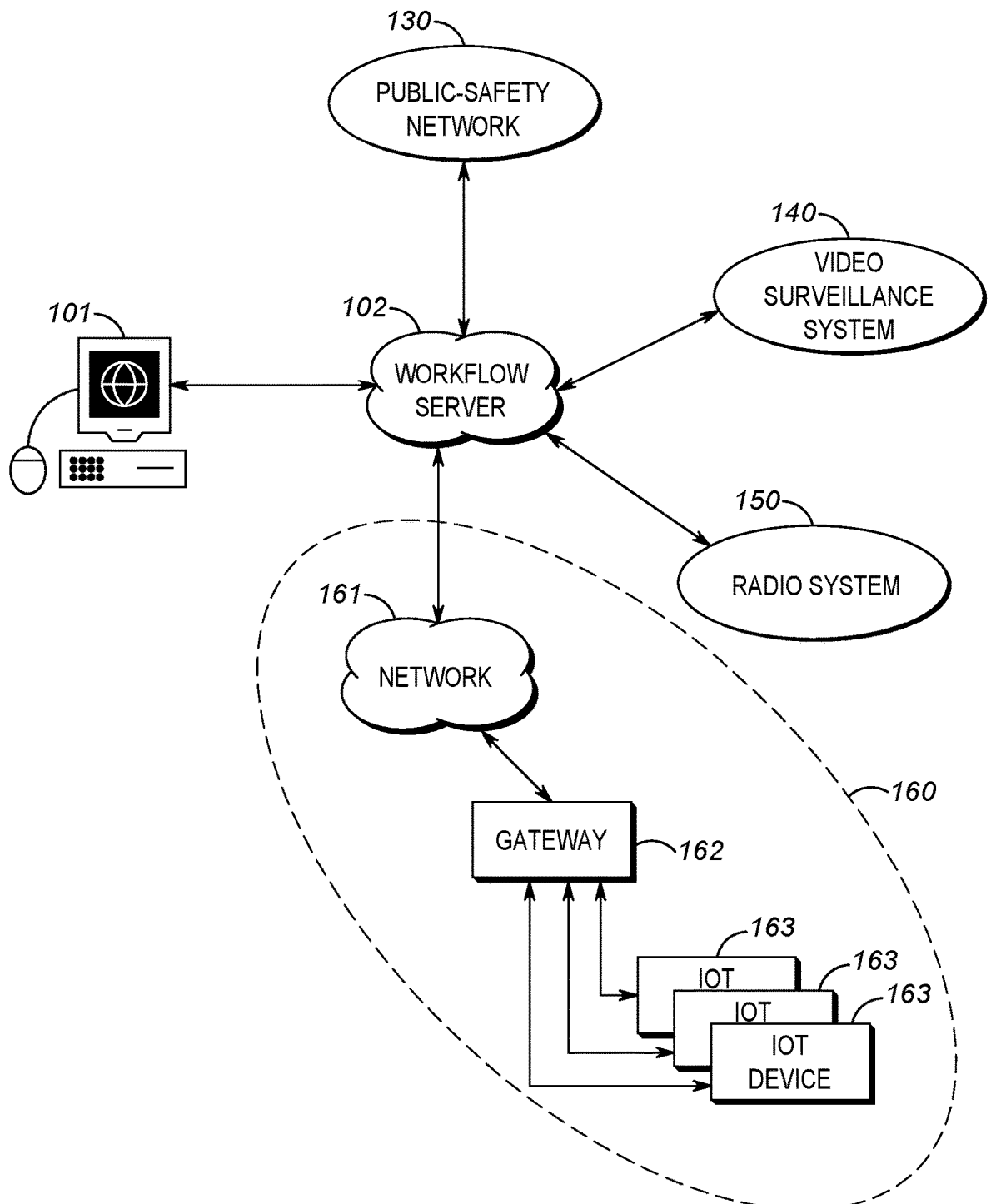
FIG. 1B illustrates a security ecosystem capable of configuring and automating workflows.

FIG. 1B illustrates a security ecosystem capable of configuring and automating workflows. In particular, FIG. 1B shows security ecosystem 100 with an expanded view of access control system 160. As shown, access control system 160 comprises a plurality of IoT devices 163 coupled to gateway 162. Data passed from workflow server 102 to IoT devices 163 passes through network 161, gateway 162 and ultimately to IoT device 163. Conversely, data passed from IoT devices 163 to workflow server 102 passes through gateway 162, network 161, and ultimately to workflow server 102.

IoT devices 163 preferably comprise devices that control objects, doors, windows, sensors, . . . , etc. As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

Gateway 162 preferably comprises an Avigilon™ Control Center running Avigilon's Access Control Management software. Gateway 162 is configured to run the necessary Application Program Interface (API) to provide communications between any IoT device 163 and workflow server 102.

Network 161 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Figure 1C:
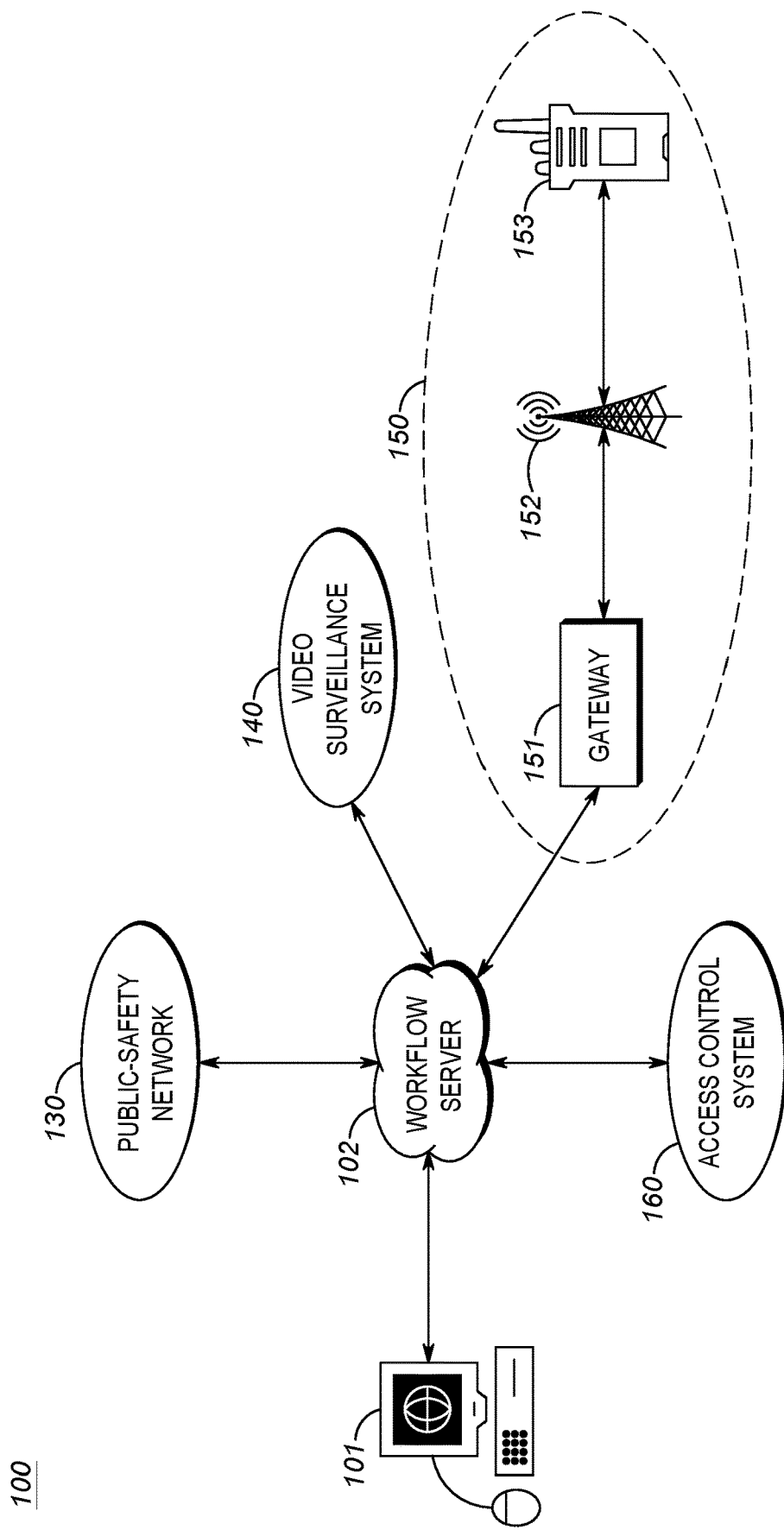
FIG. 1c illustrates a security ecosystem capable of configuring and automating workflows.

FIG. 1c illustrates a security ecosystem capable of configuring and automating workflows. In particular, FIG. 1c shows security ecosystem 100 with an expanded view of radio system 150. As shown, radio system 150 comprises gateway 151, system infrastructure 152, and at least one radio 153. Communications from radio 153 to workflow server 102 passes through infrastructure 152, gateway 151, and ultimately to workflow server 102.

Gateway 151 preferably comprises an Avigilon™ Control Center running Avigilon's Access Control Management software. Gateway 151 is configured to run the necessary Application Program Interface (API) to provide communications between any infrastructure 152 and workflow server 102.

Infrastructure 152 comprises the necessary equipment to provide wireless communications to and from radio 153. Preferably, infrastructure 152 comprises Motorola Solutions MOTOBRO™ equipment, such as an SLR Series Repeater (e.g., SLR 1000, SLR 5000, or SLR8000 repeater) configured to provide two-way radio service to radio 153.

Although only a single radio 153 is shown in FIG. 1c, one of ordinary skill in the art will recognize that many radios 153 may be present within radio system 150. Each radio 153 preferably comprises a MOTOBRO™ two-way radio (such as a Motorola Solution XPR 5000 Series radio) with digital technology providing integrated voice and data communication.

Figure 1D:
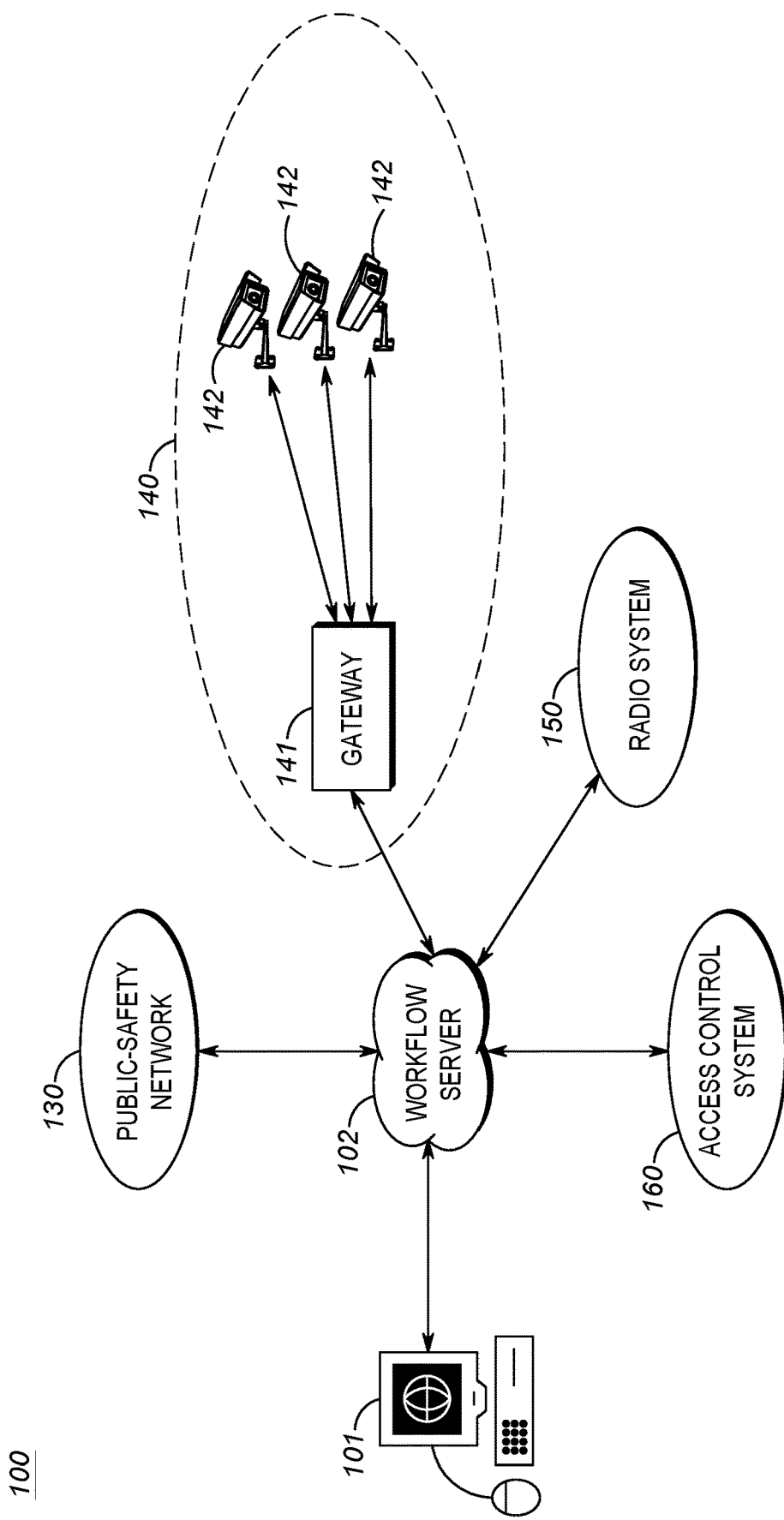
FIG. 1d illustrates a security ecosystem capable of configuring and automating workflows.

FIG. 1d illustrates a security ecosystem capable of configuring and automating workflows. In particular, FIG. 1d shows security ecosystem 100 with an expanded view of video surveillance system 140. As shown, video surveillance system 140 comprises a plurality of cameras 142 and gateway 141.

Cameras 142 may be fixed or mobile, and may have pan/tilt/zoom (PTZ) capabilities to change their field of view. Cameras 142 may also comprise circuitry configured to serve as a video analysis engine (VAE) which comprises a software engine that analyzes analog and/or digital video. The engine configured to "watch" video and detect preselected objects such as license plates, people, faces, automobiles. The software engine may also be configured to detect certain actions of individuals, such as fighting, loitering, crimes being committed, . . . , etc. The VAE may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires.

Gateway 141 preferably comprises an Avigilon™ Control Center running Avigilon's Access Control Management software. Gateway 141 is configured to run the necessary Application Program Interface (API) to provide communications between any cameras 142 and workflow server 102.

Figure 1E:
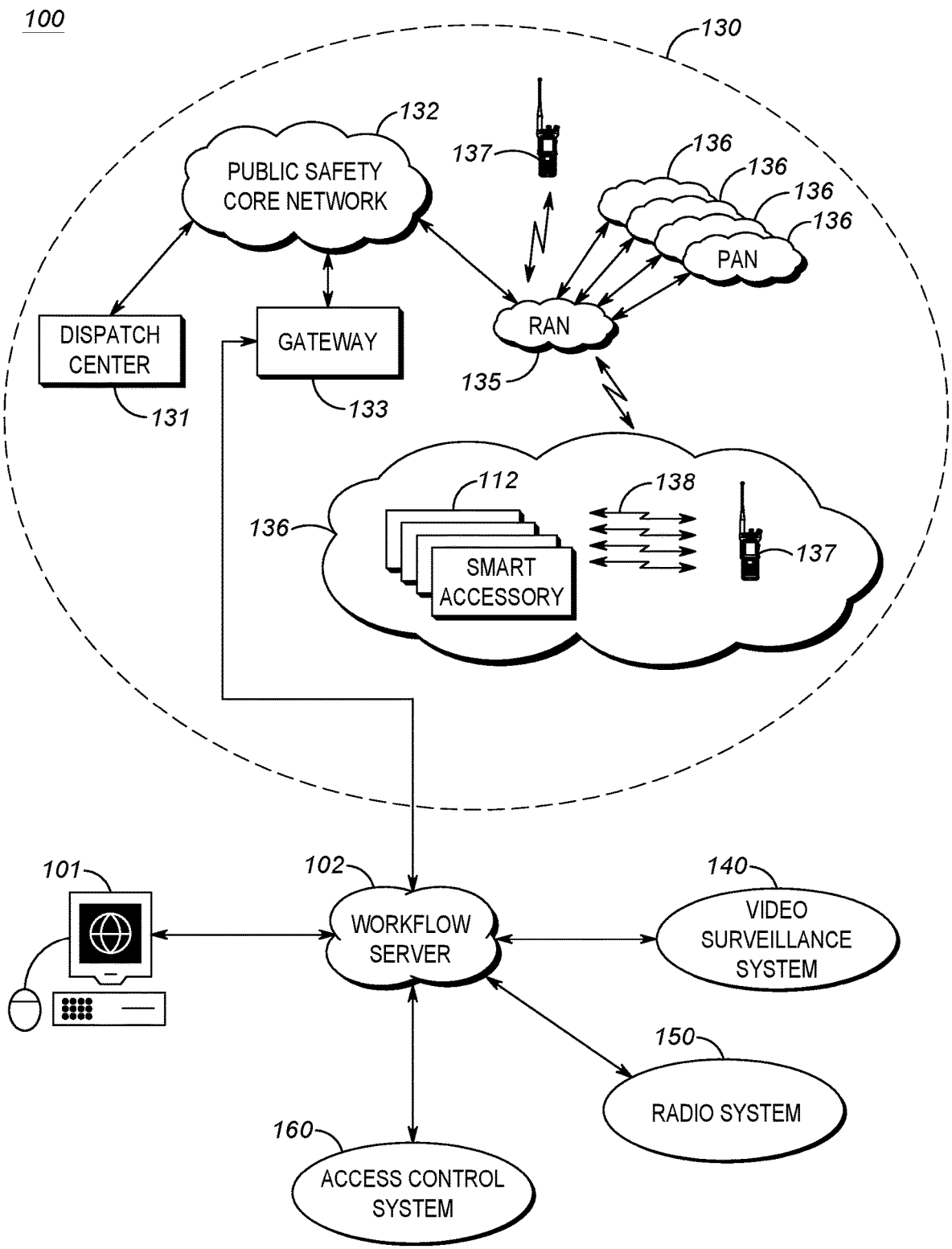
FIG. 1e illustrates a security ecosystem capable of configuring and automating workflows.

FIG. 1e illustrates a security ecosystem capable of configuring and automating workflows. In particular, FIG. 1e shows security ecosystem 100 with an expanded view of public safety network 130. As shown, public-safety network 130 comprises gateway 133, public-safety core network 132, dispatch center 131, radio access network (RAN) 135, at least one public-safety radio 137, and a plurality of personal-area networks (PANs) 136. As shown, each PAN 136 comprises radio 137 acting as a hub to smart devices/accessories 112.

Gateway 133 preferably comprises an Avigilon™ Control Center running Avigilon's Access Control Management software. Gateway 133 is configured to run the necessary Application Program Interface (API) to provide communications between public-safety core network 132 and workflow server 102.

A public safety officer (not shown in FIG. 1e) will be equipped with devices 112 that determine various physical and environmental conditions surrounding the public-safety officer. These conditions may be reported back to, for example, dispatch center 131 or workflow server 102 so an appropriate action may be taken. For example, future police officers may have a sensor 112 that determines when a gun is drawn. Upon detecting that an officer has drawn their gun, a notification may be sent back to the dispatch operator and/or workflow server 102 so that, for example, other officers in the area may be notified of the situation.

It is envisioned that the public-safety officer will have an array of these shelved devices 112 available to the officer at the beginning of a shift. The officer will select devices 112 off the shelf, and form a personal area network (PAN) with the devices that will accompany the officer on their shift. For example, the officer may pull a gun-draw sensor, a body-worn camera, a wireless microphone, a smart watch, a police radio, smart handcuffs, a man-down sensor, a bio-sensor, . . . , etc. All devices 112 pulled by the officer will be configured to form a PAN by associating (pairing) with each other and communicating wirelessly among the devices. At least one device may be configured with a digital assistant. In a preferred embodiment, the PAN comprises more than two devices, so that many devices may be connected via the PAN simultaneously.

A method called bonding is typically used for recognizing specific devices 112 and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device. Thus, as shown, public-safety communication system 130 incorporates PANs 136 created as described above. In a preferred embodiment of the present invention, radios 137 and devices 112 form PAN 136, with communication links 138 between devices 112 and radios 137 taking place utilizing a short-range communication system protocol such as a Bluetooth communication system protocol. In this particular embodiment, a pan will be associated with a single officer. Thus, FIG. 1e illustrates multiple PANs 136 associated with multiple officers (not shown).

RAN 135 includes typical RAN elements such as base stations, base station controllers (BSCs), routers, switches, and the like, arranged, connected, and programmed to provide wireless service to user equipment (e.g., radios 137, and the like) in a manner known to those of skill in the relevant art. RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 135 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 135 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 132 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 132 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group.

In another example, communication devices may dynamically affiliate with a group (and also disassociate with the group) perhaps based on user input, and the switching and/or radio network may track group membership and route new group calls according to the current group membership.

Radios 137 serves as a PAN main device, and may be any suitable computing and communication device configured to engage in wireless communication with the RAN 135 over the air interface as is known to those in the relevant art. Moreover, one or more radios 137 are further configured to engage in wired and/or wireless communication with one or more local device 112 via the communication link 138. Radios 137 will be configured to determine when to forward information received from PAN devices to, for example, a dispatch center or workflow server 102.

Some examples follow of devices 112 follow:

A sensor-enabled holster 112 may be provided that maintains and/or provides state information regarding a weapon or other item normally disposed within the user's sensor-enabled holster 112. The sensor-enabled holster 112 may detect a change in state (presence to absence) and/or an action (removal) relative to the weapon normally disposed within the sensor-enabled holster 112. The detected change in state and/or action may be reported to portable radio 137 via its short-range transceiver, which may forward the state change to dispatch center 131 or workflow server 102. In some embodiments, the sensor-enabled holster may also detect whether the first responder's hand is resting on the weapon even if it has not yet been removed from the holster and provide such information to portable radio 137.

A biometric sensor 112 (e.g., a biometric wristband) may be provided for tracking an activity of the user or a health status of a user, and may include one or more movement sensors (such as an accelerometer, magnetometer, and/or gyroscope) that may periodically or intermittently provide to the portable radio 137 indications of orientation, direction, steps, acceleration, and/or speed, and indications of health such as one or more of a captured heart rate, a captured breathing rate, and a captured body temperature of the user, perhaps accompanying other information. This information may be reported to radio 137 which may forward the information to dispatch center 131 and/or workflow server 102.

An accelerometer 112 may be provided to measures acceleration. Single and multi-axis models are available to detect magnitude and direction of the acceleration as a vector quantity, and may be used to sense orientation, acceleration, vibration shock, and falling. The accelerometer 112 may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to radio 137 which may forward the information to dispatch center 131 and/or workflow server 102.

A heart rate sensor 112 may be provided and use electrical contacts with the skin to monitor an electrocardiography (EKG) signal of its wearer, or may use infrared light and imaging device to optically detect a pulse rate of its wearer, among other possibilities. This information may be reported to radio 137 which may forward the information to dispatch center 131 and/or workflow server 102.

A breathing rate sensor 112 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to radio 137 which may forward the information to dispatch center 131 and/or workflow server 102.

Dispatch center 131 comprises, or is part of, a computer-aided-dispatch center (sometimes referred to as an emergency-call center or public-safety answering point), that may be manned by an operator providing necessary dispatch operations. For example, dispatch center 131 typically comprises a graphical user interface that provides the dispatch operator necessary information about public-safety officers. As discussed above, some of this information originates from devices 112 providing information to radios 137, which forwards the information to RAN 135 and ultimately to dispatch center 131.

In a similar manner information about public-safety officers may be provided to workflow server 102. This information originates from devices 112 providing information to radios 137, which forwards the information to RAN 135 and ultimately to workflow server 102 via core network 132 and gateway 133. For example, a gun-draw sensor 112 may send an indication to workflow server 102 that a gun has been drawn. This may serve as a "trigger" for workflow server 102 to initiate a particular "action", for example, notifying surrounding officers (for example on a particular talkgroup) by having their radios 137 provide an alarm indicating the triggering event. Thus, workflow server 102 may provide instructions to any device 112 or radio 137 by sending an "action" to devices 112 in response to a trigger being received.

Figure 2:
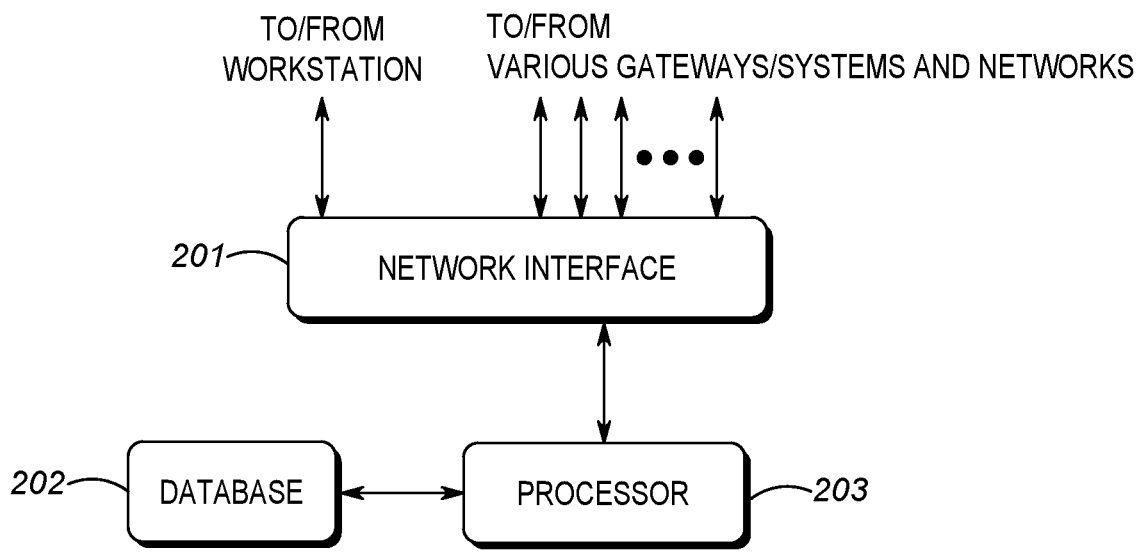
FIG. 2 is a block diagram of a workflow server of FIG. 1.

FIG. 2 is a block diagram of a workflow server of FIG. 1. As shown, workflow server 102 comprises network interface 201, database 202, and processor (serving as logic circuitry) 203.

Network interface 201 includes elements including processing, modulating, and transceiver elements that are operable in accordance with any one or more standard or proprietary wireless interfaces, wherein some of the functionality of the processing, modulating, and transceiver elements may be performed by means of processor 203 through programmed logic such as software applications or firmware stored on the storage component 202 (e.g., standard random access memory) or through hardware. Examples of network interfaces (wired or wireless) include Ethernet, T1, USB interfaces, IEEE 802.11b, IEEE 802.11g, etc.

Logic circuitry 403 comprises a digital signal processor (DSP), general purpose microprocessor, a programmable logic device, or application specific integrated circuit (ASIC) and is configured to receive triggers from various gateways, systems, and networks. Once a trigger is received, logic circuitry 203 is configured to execute (or cause to be executed) a particular action for the trigger. More particularly, when logic circuitry 203 receives a trigger from any attached network or system, logic circuitry will access database 202 to determine an action for the particular trigger. Once an action has been determined, logic circuitry will execute the action, or cause the action to be executed. In order to perform the above, logic circuitry executes an instruction set/software (e.g., Motorola Solution's Command Central™ software suite comprising the Orchestrate™ platform) stored in database 202.

Database 202 comprises standard memory (such as RAM, ROM, . . . , etc) and serves to store associations between triggers and actions. This is illustrated in Table 1, below.

TABLE 1

Associations Between Triggers and Actions.

| Trigger | Action |
| --- | --- |
| Warehouse back door opened | Pan camera 342 to point at door |
| Man-Down sensor activated for Officer Smith | Notify dispatch center via emergency text message |
| ALPR for delivery truck | Open back gate |
| . . . etc. | . . . etc. |

Figure 3:
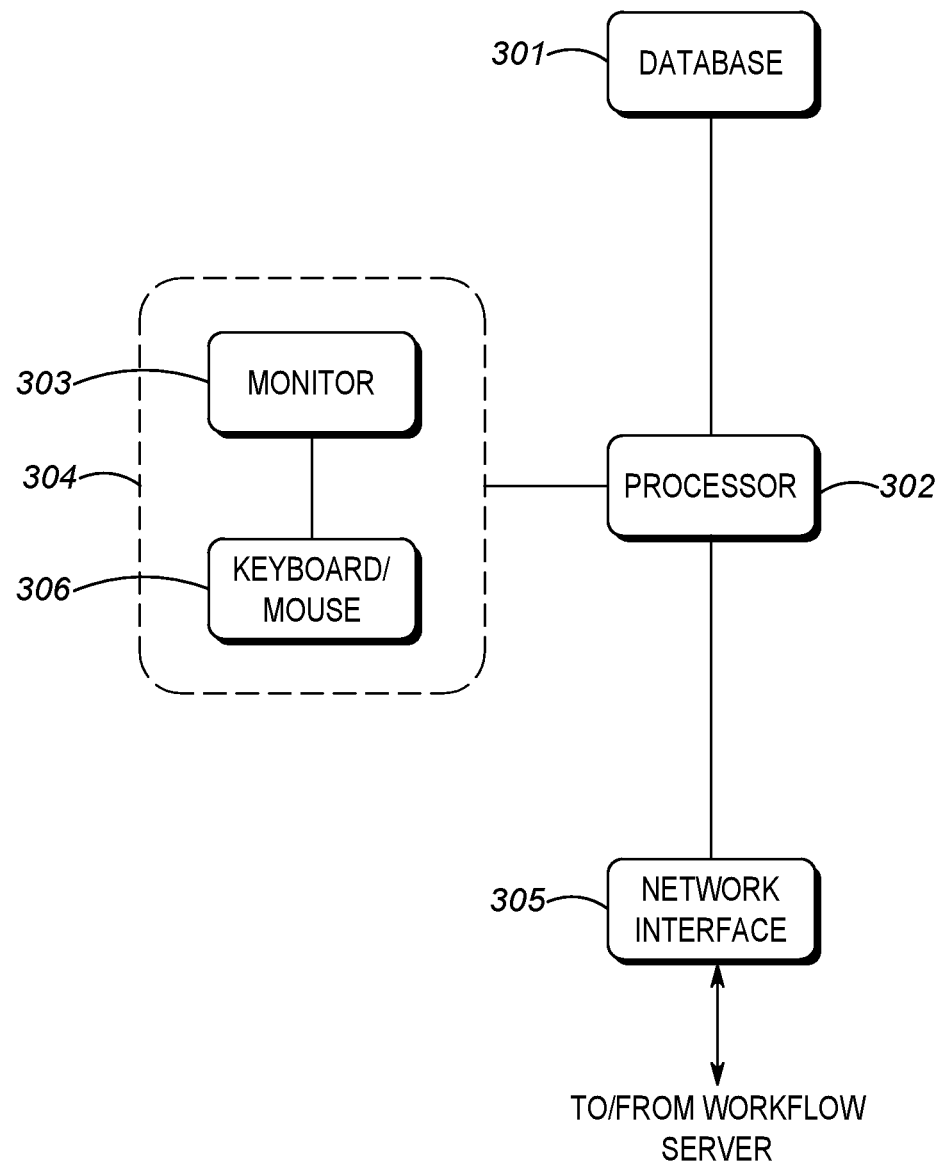
FIG. 3 is a block diagram of a workstation of FIG. 1 utilized to create a workflow.

FIG. 3 is a block diagram of a workstation of FIG. 1 utilized to create a workflow. As shown, workstation 101 comprises database 301, processor 302, graphical user interface 304, and network interface 305.

Network interface 305 includes elements including processing, modulating, and transceiver elements that are operable in accordance with any one or more standard or proprietary wireless interfaces, wherein some of the functionality of the processing, modulating, and transceiver elements may be performed by means of processor 302 through programmed logic such as software applications or firmware stored on the storage component 301 (e.g., standard random access memory) or through hardware. Examples of network interfaces (wired or wireless) include Ethernet, T1, USB interfaces, IEEE 802.11b, IEEE 802.11g, etc.

Logic circuitry 302 comprises a digital signal processor (DSP), general purpose microprocessor, a programmable logic device, or application specific integrated circuit (ASIC) and is configured to execute Motorola Solution's Orchestrate™ and Ally™ dispatch and incident management software from storage 301. The execution of such software will allow users of GUI 304 to create workflows (i.e., actions and their associated responses) by receiving user inputs from GUI 304 that define various triggers and their associated actions, which will ultimately be uploaded to workflow server 102 and stored in database 202.

Database 301 comprises standard memory (such as RAM, ROM, . . . , etc) and serves to store instructions as software. Particularly, Motorola Solution's Orchestrate™ and Ally™ dispatch and incident management software is stored in database 301.

GUI 304 provides a man/machine interface for receiving an input from a user and displaying information. For example, GUI 304 provides a way of conveying (e.g., displaying) user-created workflows. Thus, GUI 304 also provides means for a user to input workflows into a displayed form. In order to provide the above features (and additional features), GUI 304 may comprises any combination of monitor 303 (e.g., touch screen, a computer screen, . . . , etc.) and keyboard/mouse combination 306.

Figure 4:
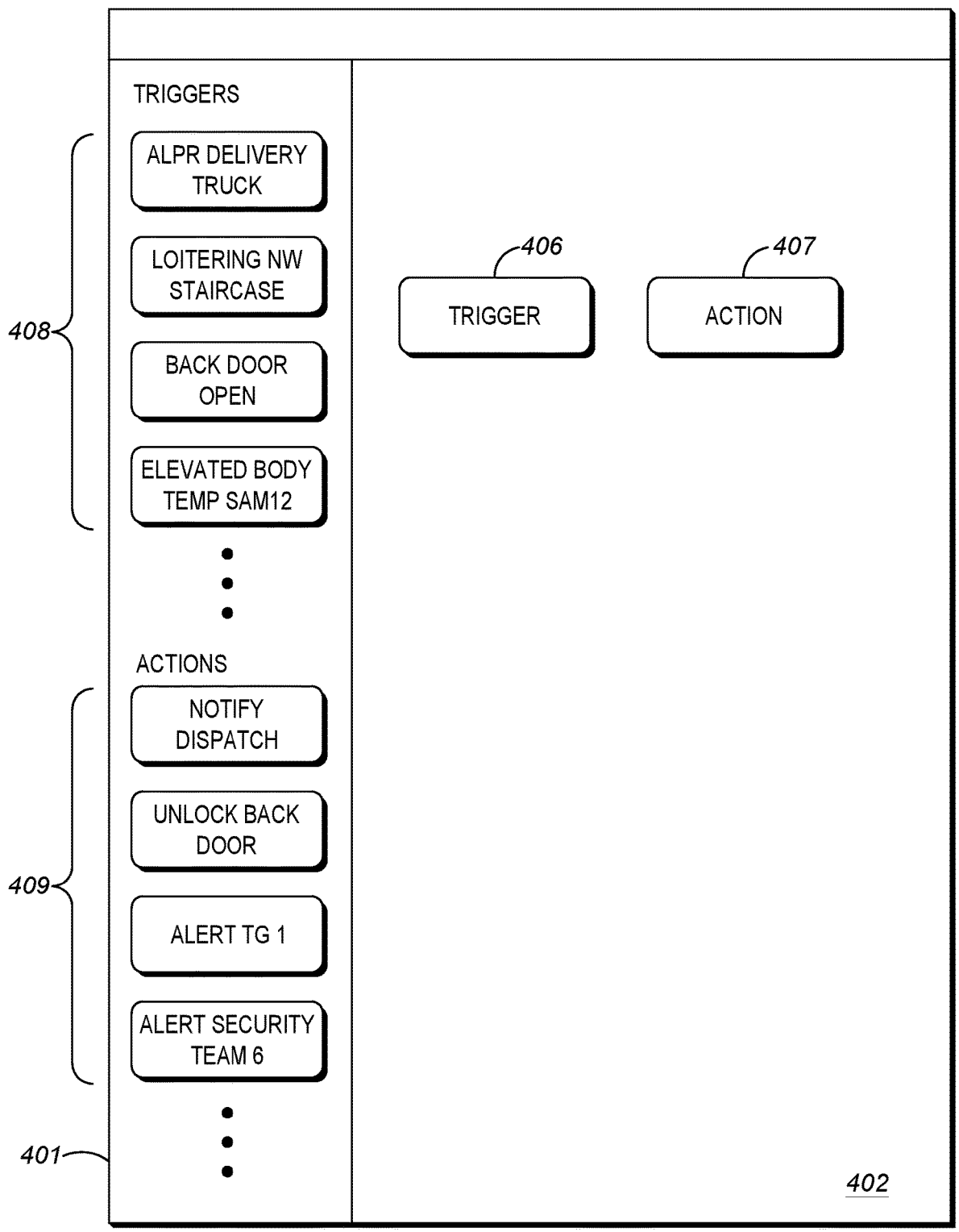
FIG. 4 illustrates the creation of a workflow.

FIG. 4 illustrates the creation of a workflow. More particularly, FIG. 4 illustrates a dashboard displayed on monitor 303 utilized for the creation of workflows. The dashboard consists of the following main elements:
 selection pane 401 on the left-hand side, which comprises the available triggers 408 and actions 409;
 workspace 402, which comprises the large area in the middle of the dashboard used to create workflows that define the connections between products. Each workflow in the workspace is displayed as a separate field 406 and 407 with an outline and a title. As shown in FIG. 4, two fields 406 and 407 are shown, one labeled "trigger" and another labeled "action".

Triggers 408 represent the events originating from various sensors, software, and devices within security ecosystem 100. Actions 409 represent the possible responses to the triggers.

After a workflow is deployed (i.e., uploaded to workflow server 102), its actions activate when the triggers occur. Triggers and actions appear on the workspace after they are dragged and dropped from the triggers 408 and actions 409 tabs respectively. Connecting the triggers and actions on the workspace (as described below) will create a workflow.

All triggers 408 and actions 409 are stored in database 301 and represent integrations across multiple products. In other words, triggers and actions comprise triggers and actions for all of the components available in security ecosystem 100. This includes cameras, sensors, IoT devices, radios, . . . , etc. As administrators add additional technology pieces to security ecosystem 100, those pieces are automatically made available for workflow creation as discussed herein.

In order to associate a trigger with an action, a user selects a trigger from all possible triggers 406, and drags and drops it onto workspace area 402. The user then selects an action for the trigger, and drags and drops it onto workspace area 402. In order to associate the trigger with the action, they must be connected. To connect the trigger and actions, a user will click the end of one of the node, and drag a line to the other node.

Figure 5:
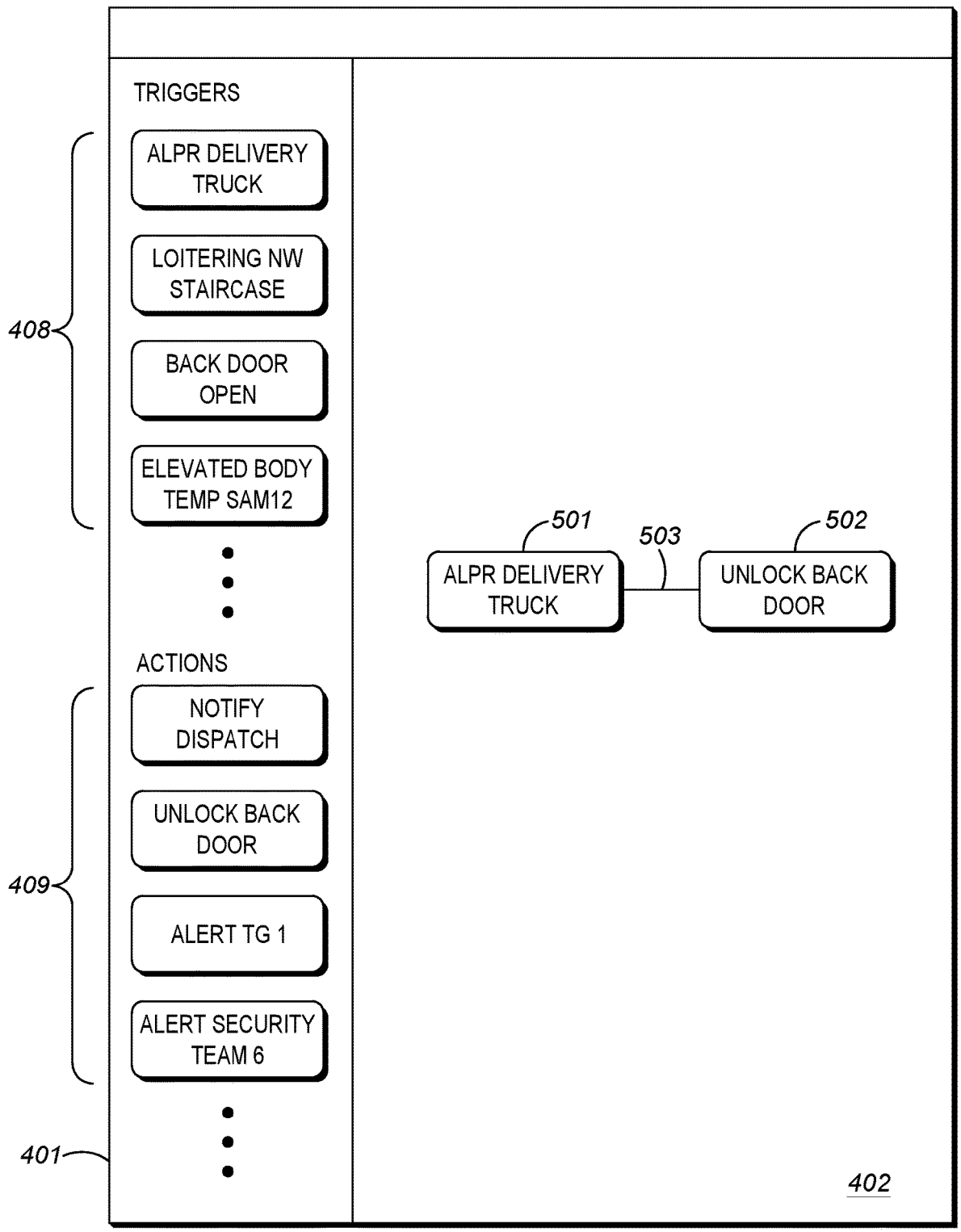
FIG. 5 illustrates the creation of a workflow.

As shown in FIG. 5, a trigger "ALPR delivery truck" 501 has been associated with an action "unlock back door" 502 by dragging line 503 between the two. If any of the triggers within a trigger group occurs, the workflow is initiated causing the action to be executed.

Figure 6:
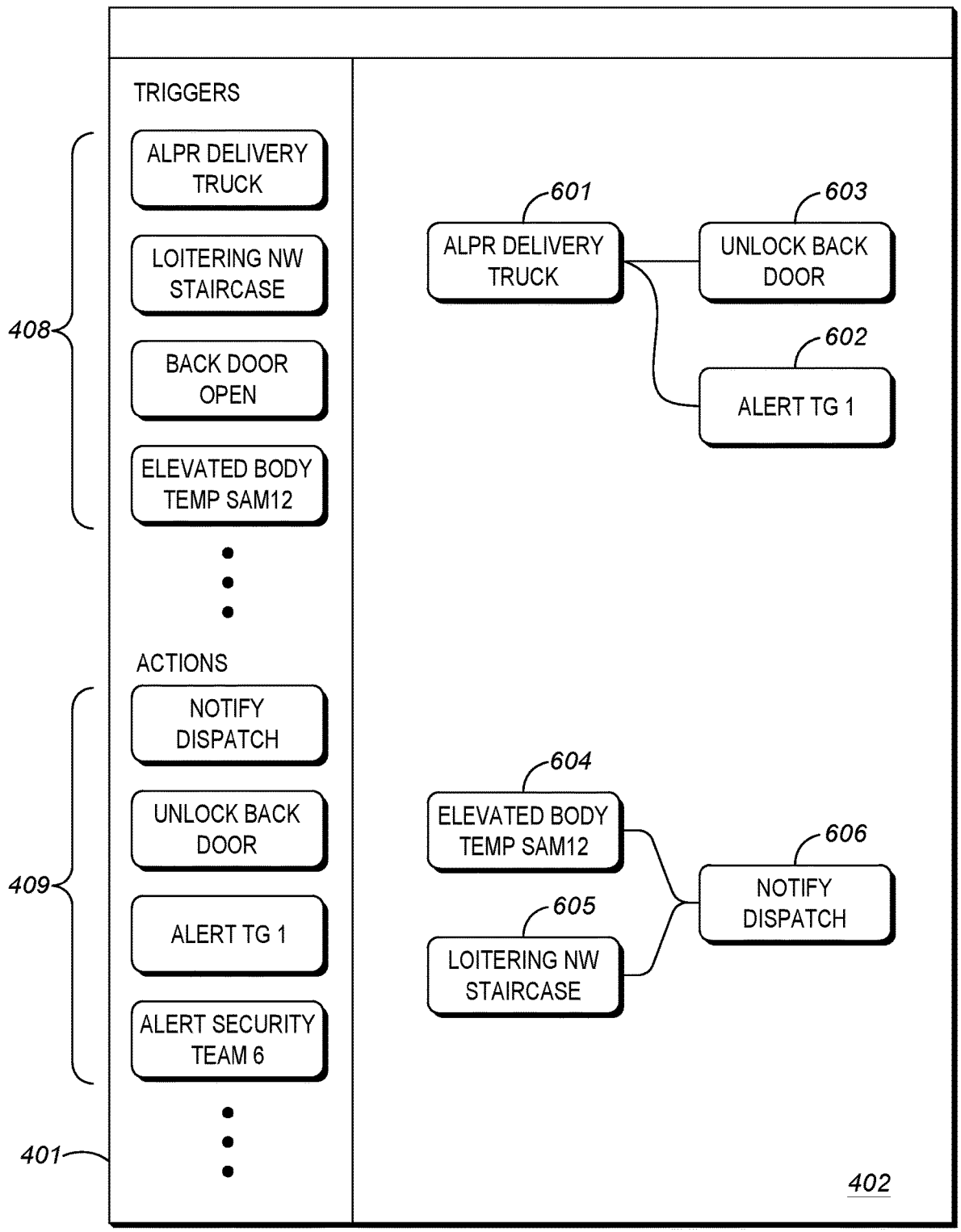
FIG. 6 illustrates the creation of a workflow.

As illustrated in FIG. 6, a single trigger may be associated with multiple actions. Thus, the trigger "ALPR delivery truck" 601 may be associated with action "unlock back door" 603 as well as associated with "alert TG 1" 602. When this workspace is uploaded to workflow server 102, the automatic license plate detected for the delivery truck will cause both the back door to unlock and an alert to be sent on talkgroup #1.

In a similar manner multiple triggers may be associated with a single action. Thus, both the triggers "elevated body tem SAM 12" 604 and "loitering NW staircase" will cause the action of "notify dispatch" 606. Thus, when officer SAM 12 has an elevated body temperature dispatch is notified, and when loitering is detected in the NW staircase, dispatch is notified.

As mentioned above, a problem arises in that a system administrator may become overwhelmed with potential triggers, actions, and associated parameters when setting up a workflow. The user may not initially understand which triggers should result in which actions, which actions should be caused by which triggers, or parameters associated with each workflow overall. Furthermore, in some cases, similar workflows may have been created by others. It would be beneficial to the system administrator to gain knowledge from workflows created by others, rather than for each system administrator to recreate work that has been done by others.

Figure 7:
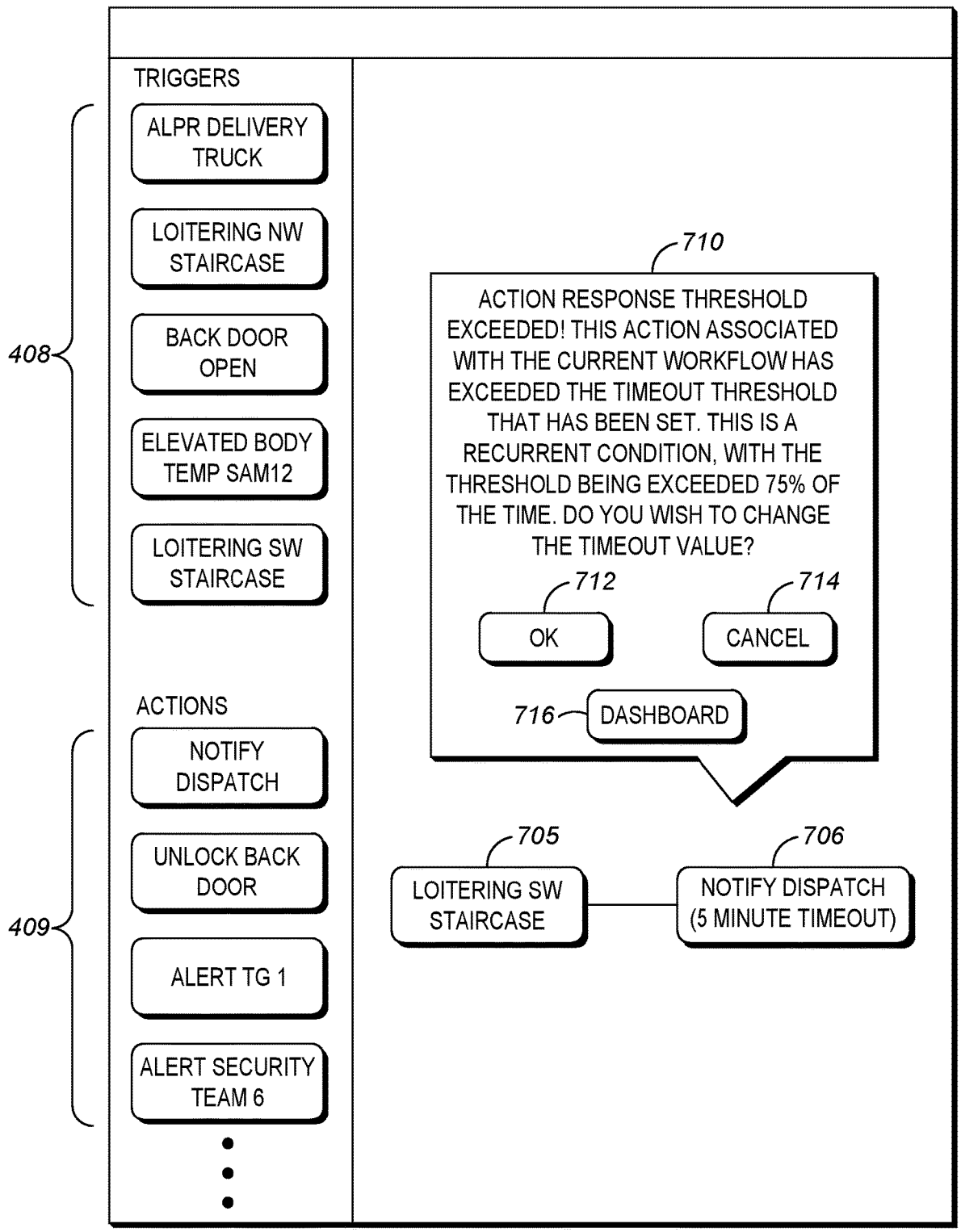
FIG. 7 illustrates an example of a display indicating that a workflow that was initiated has exceeded a response time threshold.

FIG. 7 illustrates an example of a display indicating that a workflow that was initiated has exceeded a response time threshold. The created workflow may have a trigger 705 that initiates the workflow when, in the example, loitering in the SW staircase is detected. The trigger, when it occurs, causes action 706 to be initiated. In the present example, the action 706 is to notify dispatch. In the action, a response timeout, or threshold, of 5 minutes has been specified. If the action 706 is not completed within the timeout period, an escalation workflow (not shown) may be triggered. The escalation workflow may be an alternative workflow that is executed because the trigger could not properly be handled within the designated timeout period. As explained above, in some cases, the escalation workflow may be a more disruptive response (e.g. lock down building, etc.) because the normal path did not execute properly. Regardless of what the actual escalation workflow is, it should be understood that if the action specified in a workflow does not complete within the designated time, an escalation workflow may be triggered.

In addition to triggering the escalation workflow, the UI may provide the user an indication that the workflow action did not finish in the time allotted. For example, pop up box 710 may notify the user that the action response threshold has been exceed ("e.g. "Action Response Threshold Exceeded!"). The user may also be notified that the condition is recurrent, meaning that this is not the first time that the threshold has been exceeded. In addition, the user may be informed as to how often the threshold has been exceeded. For example, a pattern in exceeding the threshold may be detected (e.g. threshold exceeded more than 75% of the time). In the present example, in UI popup 710, the user is notified that, "The action associated with the current workflow has exceeded the timeout threshold that has been set. This is a recurrent condition, with the threshold being exceeded 75% of the time. Do you wish to change the timeout value?"

The user may be given the option to execute several different actions. First, the user may be given the option to select a cancel button 714 (or other similar control) to effectively ignore the fact that the timeout threshold has been exceeded. In effect, the user informs the system that although they are aware the timeout threshold has been exceeded, they do not wish to make any changes to it at this time.

In some implementations, as part of selecting the cancel 714, the user may be directed to a page where details related to why the threshold being exceeded is being ignored can be provided, for later review by a system administrator. For example, assume the threshold related to the amount of time allotted for a security guard to drive to the location to check out whatever it was that caused the trigger. Assume that the security guard response was delayed because the route the guard would normally drive was being blocked by a parade that occurs once a year. This is an anomaly that would not occur very often, and as such, a response that was delayed because of a one-off occurrence such as the parade, should not necessarily be included in determining what the normal response time threshold should be. When a user indicates that the response timeout was an anomaly, although still stored, that particular instance of exceeding the response timeout threshold is not included in the determination of patterns of exceeding the response timeout threshold.

The user may be given the option to select OK 712 control, indicating that he wishes to change the response time threshold. In some cases, the user may simply be given an option to enter a new response time threshold to be included in action 706. In some cases, the system has been monitoring the execution of action 706 and is able to establish patterns of responses. For example, the system may know, based on historic data, that 75% of the responses exceed the current response time threshold. The user may be given an option to select a new timeout value that would cause none of the existing response responses to have exceed the new timeout value (e.g. select a timeout that is equal to the longest recorded action response time, etc.). In the alternative, the user may be given the option to select a timeout value such that the majority of response would not have resulted in a timeout. For example, if 90% of responses are within 6 minutes, the user may be given the option to set the timeout value to 6 minutes, because it appears that this is a more realistic response time, as it is met 90% of the time.

In addition to being given options to either modify the current response time threshold or ignore that the response time for the action exceeded the threshold, the user may also be given an option to select a dashboard 716 view. The dashboard may allow for the user to visually see each initiation of the workflow and the result. A dashboard view is described in further detail with respect to FIG. 8.

Figure 8:
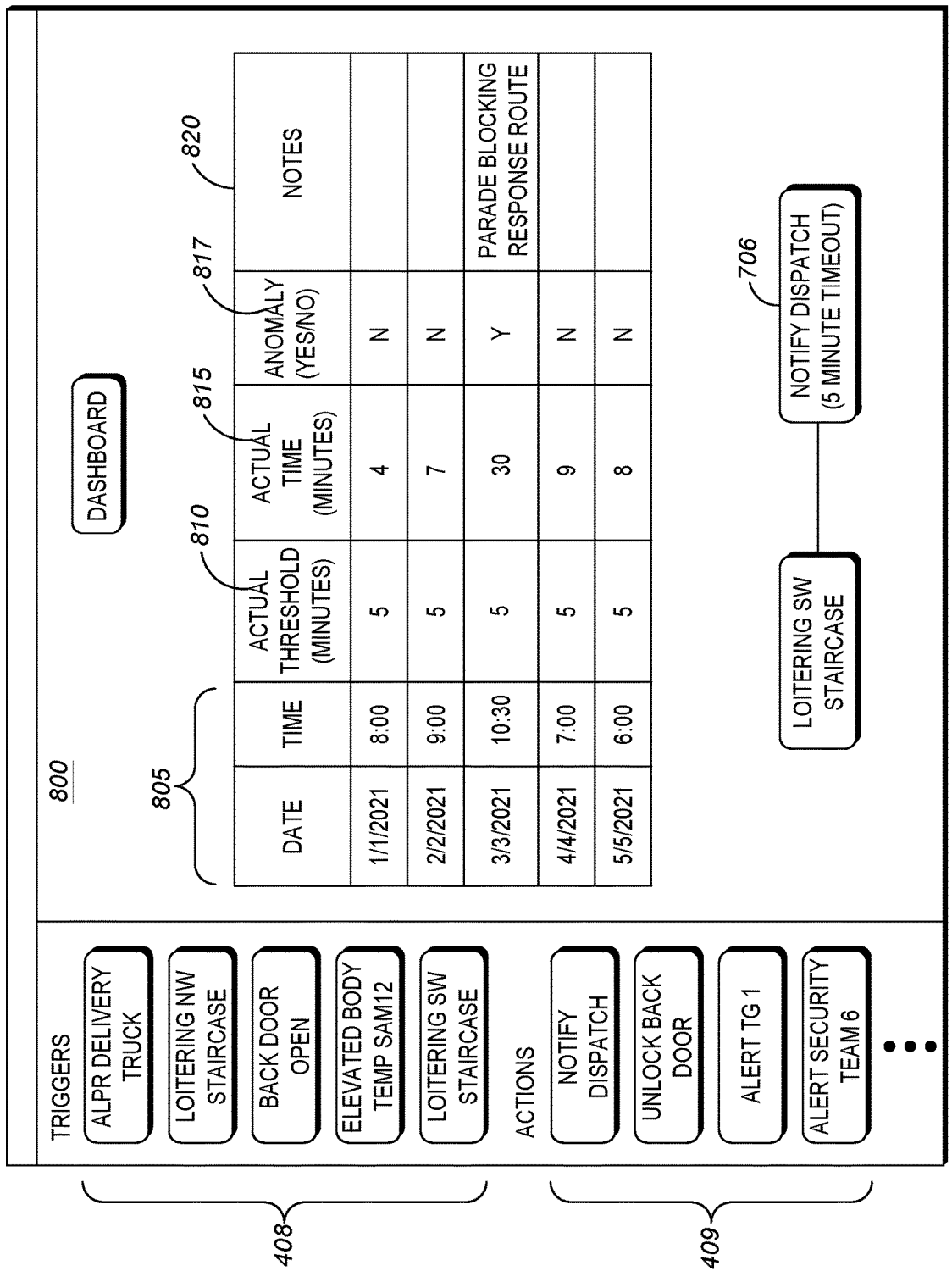
FIG. 8 is an example of a dashboard 800 that may be presented to a system administrator when making a determination as to if the response time of an action in a workflow needs to be changed.

FIG. 8 is an example of a dashboard 800 that may be presented to a system administrator when making a determination as to if the response time of an action in a workflow needs to be changed. For example, as described with respect to FIG. 7, when a workflow action response time exceeds a threshold, the user may be given an option to review the dashboard that shows response times for all initiations of that particular workflow. In addition, the system administrator may periodically review the dashboard to determine how the workflow is performing and if changes need to be made. Although many of the examples described thus far include the workflow response time threshold being exceeded, it is equally possible that the response time may be set too large. For example, if the response time is set to have a threshold of 5 minutes, yet 90% of responses occur within 3 minutes, the response time threshold may be set too large. The threshold could be reduced to 3 minutes, with almost no impact on the workflow. However, if the response times begin exceeding the threshold, the system administrator may become aware that something has changed, causing response times to go up.

Dashboard 800 may display the response times for a given action 706. For example, the dashboard may include a date and time 805 that the workflow was initiated. The dashboard may also include the time threshold 810 that was in place at the time the workflow was initiated. The time threshold allows the user to understand the historical value of the threshold. For example, if a threshold is changed, it would be useful to understand what the threshold was previously, at the time the workflow was initiated.

The dashboard 800 may also include the actual response time 815. The actual response time is when the response was actually received for that particular initiation of the action. If the actual response time exceeds the time threshold 810, then the response was not timely, and an escalation workflow may have been executed.

The dashboard may also include if the response was considered an anomaly 817. As explained above, in some cases a response time may exceed the threshold due to known anomalous conditions (e.g. once a year parade blocking road, etc.). In such cases, the user may be allowed to indicate the response as an anomaly. Indication of a response as an anomaly may cause that response time of that particular initiation of the workflow to be ignored for purposes of pattern detection with the response times. The reason being that if there is a known, one-off condition that caused a response to exceed a threshold, that response is not generally part of a pattern. In order to ensure that only true anomalies, as opposed to simple failure to meet the response time threshold, are excluded from pattern detection, the user may be asked to enter a note 820, indicating why the response for the particular workflow initiation did not meet the specified response time. Upon review, the system administrator may determine that there was not a true anomaly, and remove the anomaly indication, thus causing the specific initiation to again be considered when determining patterns in the response times.

Figure 9:
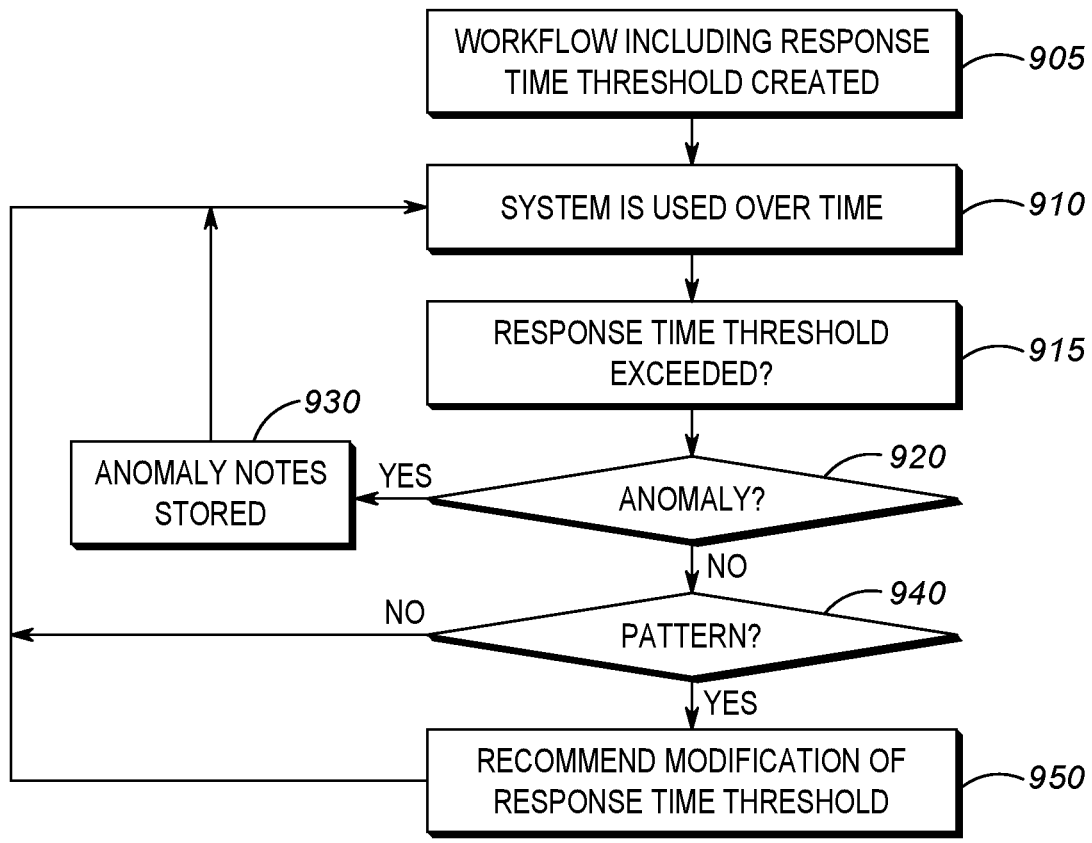
FIG. 9 is an example of a high level flow diagram 900 for implementing the techniques described herein.

FIG. 9 is an example of a high level flow diagram 900 for implementing the techniques described herein. In block 905, a workflow including response time threshold is created. The particular workflow being created is relatively unimportant. What should be understood is that the workflow includes at least one action, and that at least one action has a response time threshold. If the action is not completed within the response time threshold, some form of escalation workflow may be initiated. Initially, the system administrator creating the workflow may not have an accurate estimate as to the proper value to set the response time threshold.

In block 910, the system is used over time. As the system is used over time, each initiation of the workflow can be monitored. In particular, meeting or exceeding the response time threshold can be monitored. Monitoring the response times may allow the system to determine patterns in the response times. It should be noted that response times may be stored for both responses that completed within the threshold timeout value as well as those that exceeded the threshold timeout value. By storing both success and failure cases, the system may be better able to detect patterns, such as the percentage of times the response time is not met, in relation to the total number of times the workflow is initiated. If the response time is not exceeded, the process may remain in block 910.

In block 915, it may be detected that the response time has been exceeded. Exceeding the response time threshold may be dependent on the type of action specified by the workflow. For example, if the action is alert security guards, the response time may be when the security guards indicate they are at the scene of the incident. In the case of a building evacuation, the response time may be the time when the building is fully evacuated. What should be understood is that the response time is the time needed for the action to actually complete. This is not necessarily the response time of a human to the incident.

In block 920, it may be determine if the response time threshold was exceeded due to an explainable anomaly. As explained above, in some cases a response time may exceed the threshold because of a known condition that is not expected to be consistent (e.g. parade blocking road). In such cases, the response time being exceeded is not necessarily an error in the setting of the response time within the workflow, but rather was simply an anomaly that could not be accounted for when creating the workflow. If it is determined that the response time was exceeded due to an anomaly, the process moves to block 930. Otherwise the process moves to block 940.

In block 930, after it has been determined that the response time exceeded the threshold due to an anomaly, the user may be required to enter anomaly notes which are stored. The anomaly notes may describe the particular circumstances as to why the response time threshold was exceeded. The anomaly notes may allow the system administrator to assess if failing to meet the response time threshold was truly an explainable anomaly, or was actually just a failure of the workflow to achieve the response time threshold that was set. The anomaly notes may be displayed on the dashboard, as was described with respect to FIG. 8.

In block 940, the response time may be analyzed to detect patterns in the response times. For example, if the response times exceed the response time thresholds in the majority of cases, this may indicate that the response time threshold needs to be set higher or that the action may need to be reviewed to determine why the action is consistently taking longer than the set time. If the response time is met most of the time, this may indicate that the response time is either set correctly, or may be set too high. If no pattern is detected, the process returns to block 910 where system use is monitored over time.

If a pattern is detected, the process moves to block 950. In block 950, modifications to the response time threshold may be recommended. For example, if the response time threshold is consistently exceed by 2 minutes, a recommendation may be made to increase the response time threshold by 3 minutes. What should be understood is that the patterns that are detected in the response times may determine the modifications that are recommended.

Figure 10A:
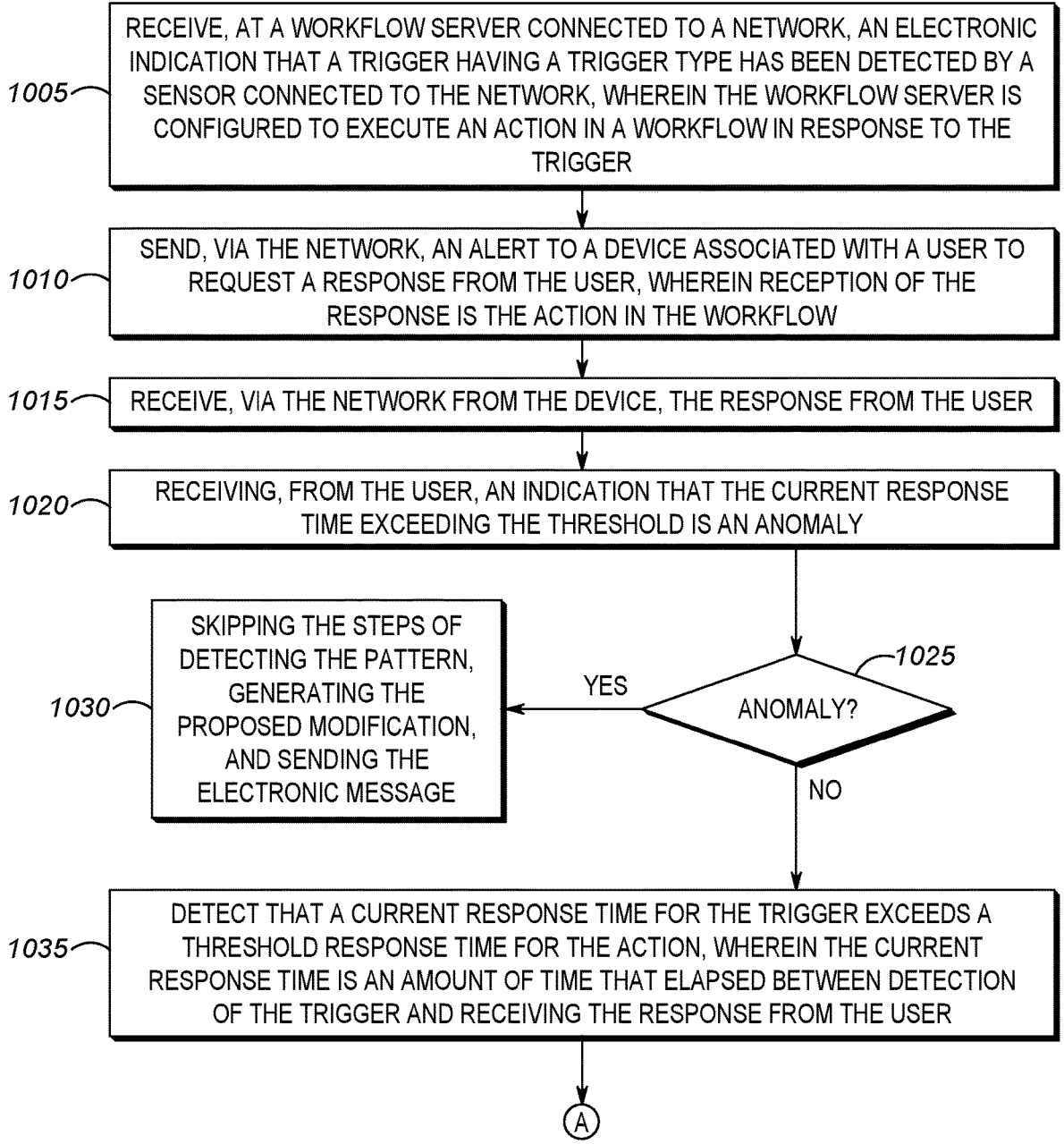
FIGS. 10A and 10B are an example of a flow diagram 1000 that may implement the techniques described herein.
Figure 10B:
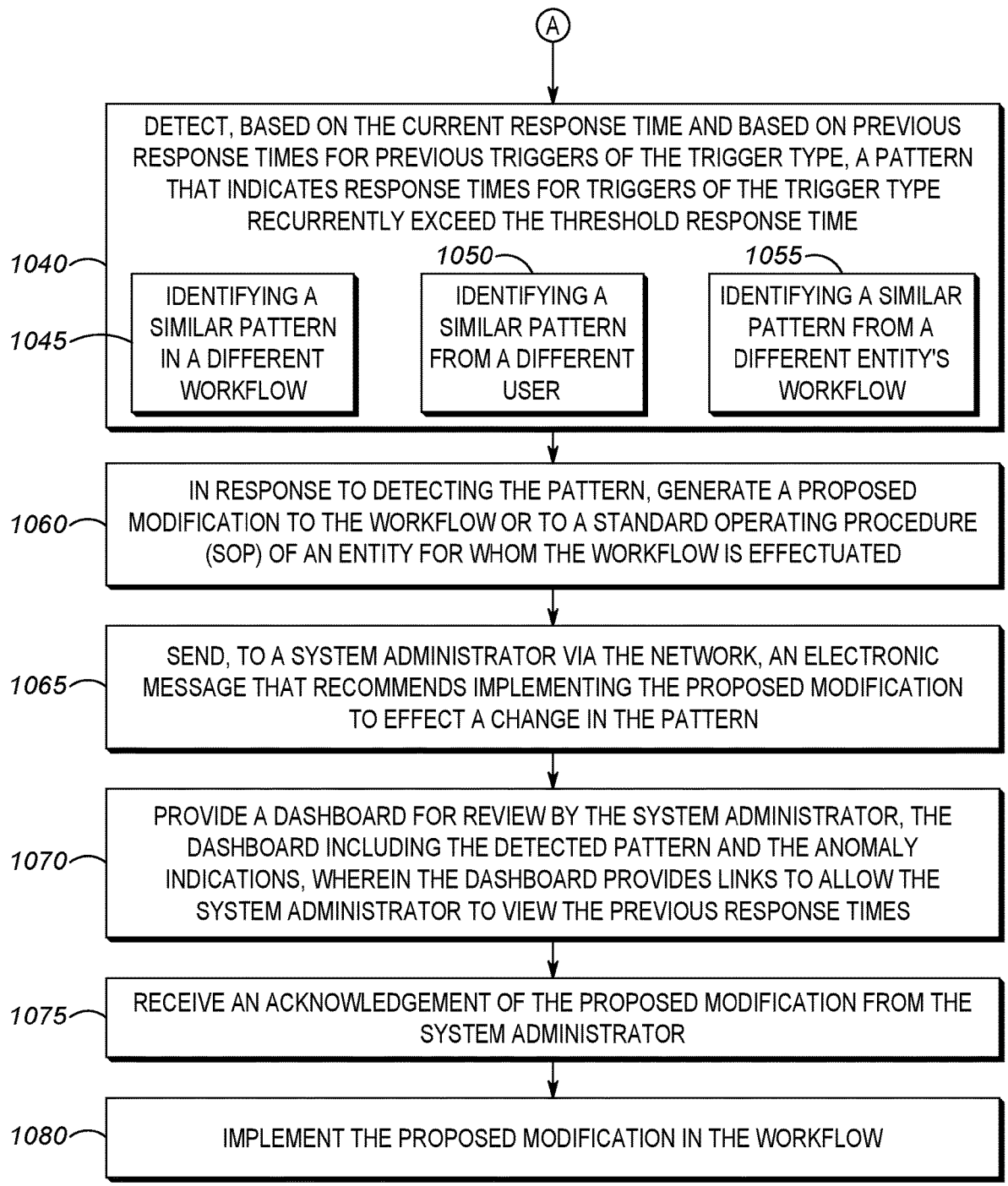

FIGS. 10A and 10B are an example of a flow diagram 1000 that may implement the techniques described herein. In block 1005, an electronic indication that a trigger having a trigger type has been detected by a sensor connected to the network may be received at a workflow server connected to a network. The workflow server may be configured to execute an action in a workflow in response to the trigger. As explained above, workflows may be created that include triggers and actions. The workflow may be initiated when a trigger is received. The trigger may be an indication from an electronic sensor coupled to a system such as a public safety system, an access control system, a video surveillance system, etc. The various systems may be coupled to the workflow server via one or more networks.

In response to receiving the trigger, a workflow may be initiated. The workflow can include executing one or more actions (e.g. unlock door, dispatch security personnel, etc.). In block 1010, an alert may be sent, via the network, to a device associated with a user to request a response from the user. Reception of the response is the action in the workflow. For example, a trigger that detects a condition may initiate a workflow. An action associated with the workflow may be to send an alert to a radio device associated with a user, such as a security guard. For example, the system may notify the security guard to investigate the source of the trigger to determine if something is wrong, and requires attention.

Although the alert is described as being sent to a device associated with the user, it should be understood that the alert need not be directed to an actual human user. For example, in some cases, the action may be for a system to activate a sensor and or actuator that is accessible via the network. For example, the action could be to cause a door to lock/unlock, sound a siren to begin a building activation, etc. What should be understood is that the action may indicate that some task is to be performed. The action may have associated with it a time threshold for when it is expected that the action will be completed.

In block 1015, the response form the user may be received via the network from the device. In general, the response is an indication that the action has been completed. For example, in the case where the action is to notify a user of a radio device, such as a security device, to investigate the trigger that initiated the workflow, the response may be an indication from the user that the investigation has begun. In the case that the response is a physical action by a device (e.g. door locking, alarm sounding, etc.) the response may be an indication that the action has been executed (e.g. door is locked, alarms has been sounded, etc.). What should be understood is that receipt of the response indicates that the action specified in the workflow that was initiated has been completed.

In block 1020, an indication that the current response time has exceeded the threshold response time is an anomaly may be received from the user. In some cases, a response time may exceed that which was expected due to a known, one-off condition. An example presented above was a security guard response being delayed because a route to the incident scene was blocked by a parade that occurs once a year. In other words, an anomaly is a known reason why the response was delayed, and that reason is likely not a recurring reason.

If the response exceeding the threshold was indicated as an anomaly in block 1025, the process may move to block 1030. In block 1030, the steps of detecting the patterns, generating the proposed modification, and sending the electronic message (described in further detail below) may be skipped. In other words, if the response is indicated as an anomaly, it is not necessary to analyze the response further to determine if the threshold response time needs to be modified. Although not shown, part of declaring the response an anomaly may also include providing detailed information as to why the response is being considered an anomaly. A system administrator may periodically review the responses from the workflow, including responses that were indicated as being an anomaly. If a response is not truly an anomaly (e.g. the user simply did not meet the response time threshold for reasons that may include things such as poor performance of the user) the system administrator may change the designation to indicate the response was not an anomaly. In such cases, the failure to respond within the threshold time will again be included in the analysis to determine if the threshold response time needs to be modified.

If the response is determined to not be an anomaly in block 1025, the process moves to block 1035. In block 1035, the system may detect that a current response time for the trigger exceeds a threshold response time for the action. As explained above, the current response time is an amount of time that elapsed between detection of the trigger and receiving the response from the user, the response form the user indicating that the action has been completed. In other words, in block 1035, the system has now detected that the current response time has exceeded the threshold, and that there is no anomalous condition that explains why the response time threshold was exceeded.

In block 1040, based on the current response time and based on previous response times for previous triggers of the trigger type, a pattern may be detected. The pattern may indicate that response times for triggers of the trigger type recurrently exceed the threshold response time. For example, if the response time exceeds the threshold response time more than 50% of the time, this may indicate that the response time threshold is set incorrectly or that something in the action may need to be modified in order to achieve a response within the threshold response time more consistently. A response time that exceeds the threshold response time more than a system administrator defined percentage of occurrence may be considered a pattern.

Although response times of an action within a given workflow may be used to detect patterns, additional response times for other responses may be used as well. For example, in block 1045, identifying a similar pattern in a different workflow may be used to detect a pattern in the current workflow. For example, consider a case where multiple triggers or trigger types cause the same action to occur (e.g. dispatch a security guard to investigate a trigger, etc.). If the same action occurs in multiple workflows, and in a certain number of those workflows the response time threshold is exceeded, this may indicate that there is an issue with the response time threshold that is set for the action. The reason for this is that if the same action causes a pattern of response times exceeding the threshold, the issue may likely be with the response time threshold for that action, rather than with each of the individual workflows.

As another example, in block 1050, identifying a similar pattern from a different user may be used to detect a pattern in the current workflow. For example, consider a case where there are three security guards. Assume the first two security guards consistently achieve the response time threshold for an action that includes alerting a security guard. Assume that the third security guard consistently exceeds the response time threshold when responding to the alert. Thus, a pattern may be detected that the third security guard consistently exceeds the response time threshold.

As yet another example, in block 1055, identifying a similar pattern from a different entity's workflow may be used to detect a pattern in the current workflow. In some implementations, the workflow server may provide a security ecosystem for multiple entities (e.g. campus security forces for two college campuses, a shopping mall security force, etc.). The workflow server would then have access to workflows, and hence response time thresholds being exceeded for multiple entities. A pattern may be detected in response times for different entities. For example, assume that the response times for security guards responding in a first college campus generally occurs within the response time threshold while in a second college campus, the response times consistently exceed the response time thresholds. Assuming the two college campuses are similar, there may be differences in the standard operating procedures (SOP) between the two campuses that cause the difference.

These detected patterns may then be used to suggest modifications to the response time thresholds or SOPs, as will be described in further detail below. Although several examples of techniques used to detect patterns in the response times are described, it should be understood that these examples were provided for purposes of description and not by way of limitation. The list of example techniques that may be used to detect patterns is not intended to be exhaustive.

In block 1060, in response to detecting the pattern, a proposed modification to the workflow or to a standard operating procedure (SOP) of an entity for whom the workflow is effectuated may be generated. Once it has been determined that the given workflow has exhibited a pattern of recurrently exceeding a threshold response time, a modification to the workflow may be suggested. For example, a change to the workflow itself may be suggested. In a simple case, the change to the workflow may simply be to alter the threshold response time to increase the value such that the majority of responses would then fall within the new response time threshold. In other words, if the response times so consistently exceed the threshold, the problem may be that the threshold itself is currently set to an unreasonable value.

In yet other cases, the proposed solution may be to change the action that is executed upon initiation of the workflow. For example, if the current response is to alert security personnel to respond to an incident, the workflow may be modified to indicate that the alert should be sent to a building manager of the location where the trigger was generated (assuming that would result in a shorter response time, as the building manager may be located on site, and need not travel to the building).

In yet other cases, the proposed solution may be a modification to the SOPs used to carry out the action. For example, the action to alert a security guard may have a SOP that states the assigned patrolling security guard should respond to the incident upon the alert being triggered. The proposed modification to the SOP may be that the security guard located nearest to the incident, regardless of their currently assigned task, should be the security guard that should respond upon the alert being triggered. The change in SOP may be the result of determining that the workflow of a different entity does not suffer from the response times exceeding a threshold to the same degree as the current workflow. The proposed modifications to the currently workflow may include adopting at least some portion of the SOPs of the entity that is not experiencing the response time threshold being exceeded.

In block 1065, an electronic message that recommends implementing the proposed modification to effect a change in the pattern may be sent to a system administrator. Although the system described herein may detect patterns of response time thresholds being exceeded and recommend changes to workflows that may reduce the number of times response time thresholds are exceeded, the system will not make any changes autonomously. Review and approval of a system administrator may be a required step. However, it should be understood that this is not a limitation of this disclosure, but rather ensures that a human provides input and/or approval to any changes made to workflows or SOPs. In other implementations, the alterations to the workflows may occur without human intervention. It should further be understood that the system administrator may also view the proposed modifications as merely an input, and may use the proposal to guide their decision as to how to modify the workflow. This may be to accept the proposal as is, or to make modifications to the proposal, including completely ignoring the proposal.

In order to aid the system administrator in making the decision to modify the workflow or SOPs, in block 1070, a dashboard may be provided for review by the system administrator. The dashboard may include the detected pattern and the anomaly indications. The dashboard may provide links to allow the system administrator to view the previous response times. The dashboard may also allow the system administrator to review any response times that exceeded the threshold, but were indicated as anomalies. The system administrator may be able to reverse any indication of the response being an anomaly, if they determine that the response was actually not an anomaly.

In block 1075, an acknowledgement of the proposed modification may be received form the system administrator. In other words, the system administrator may provide an indication that they are going to modify the existing workflow (either according to the proposed modification, the proposed modification with changes, or modifications defined solely by the system administrator). In other words, the system administrator may acknowledge that changes to the workflow or SOP may be made.

In block 1080, the proposed modifications to the workflow may be implemented. This implementation may include changing the response time thresholds, changing the actions performed, or modifying the SOP that is used when executing an action. In other words, the proposed modification is integrated within the workflow based on the recommendation.

Figure 11:
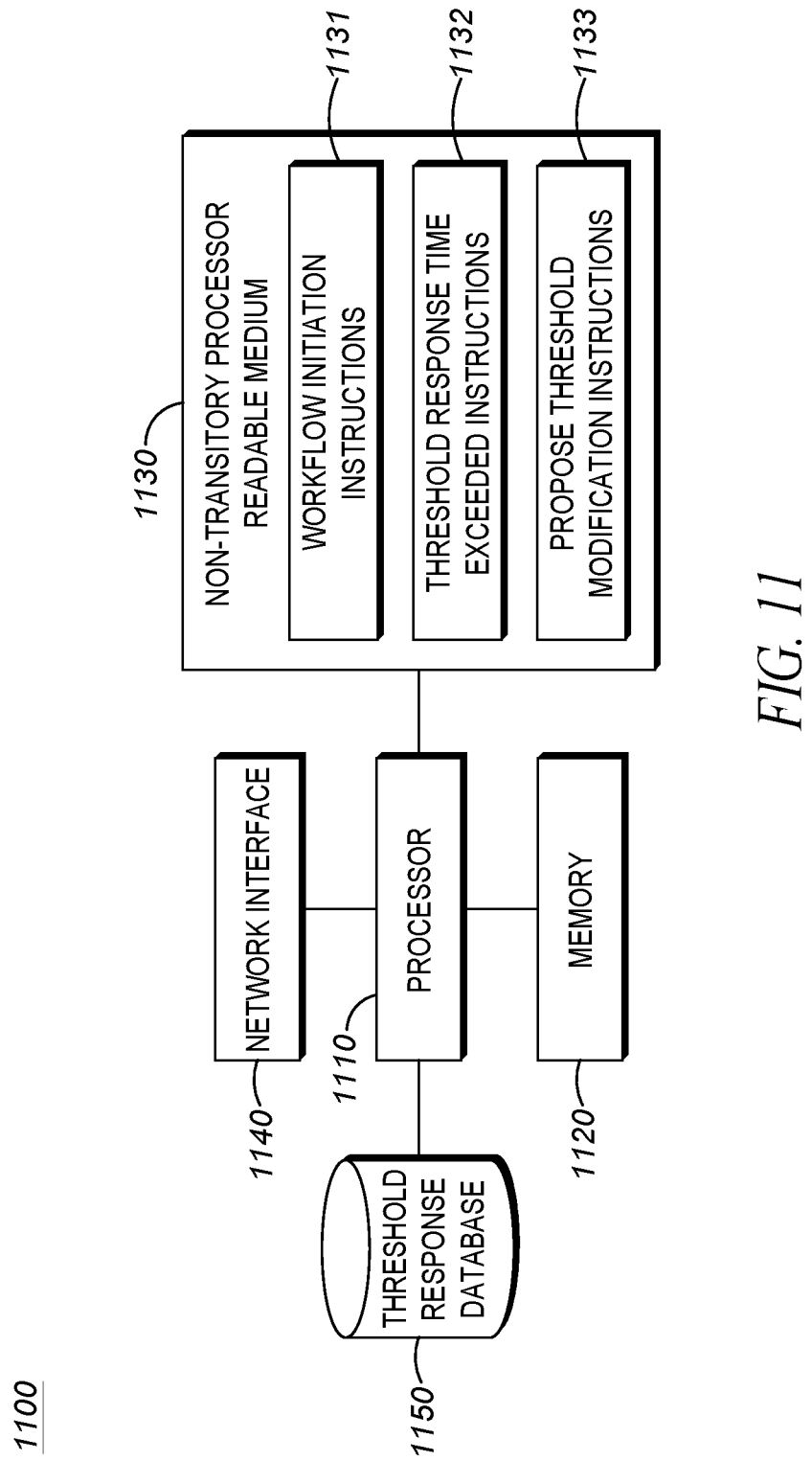
FIG. 11 is an example of a device 1100 that may implement the techniques described herein.

FIG. 11 is an example of a device 1100 that may implement the techniques described herein. For example device 1100 may implement the workflow server and/or workstation used with the techniques described herein. It should be understood that device 1100 represents one example implementation of a computing device that utilizes the techniques described herein. Although only a single processor is shown, it would be readily understood that a person of skill in the art would recognize that distributed implementations are also possible. For example, the various pieces of functionality described above (e.g. workflow creation, comparison, and proposal, etc.) could be implemented on multiple devices that are communicatively coupled. FIG. 11 is not intended to imply that all the functionality described above must be implemented on a single device.

Device 1100 may include processor 1110, memory 1120, non-transitory processor readable medium 1130, network interface 1140, and threshold response database 1150.

Processor 1110 may be coupled to memory 1120. Memory 1120 may store a set of instructions that when executed by processor 1110 cause processor 1110 to implement the techniques described herein. Processor 1110 may cause memory 1120 to load a set of processor executable instructions from non-transitory processor readable medium 1130. Non-transitory processor readable medium 1130 may contain a set of instructions thereon that when executed by processor 1110 cause the processor to implement the various techniques described herein.

For example, medium 1130 may include workflow initiation instructions 1131. The workflow initiation instructions 1131 may cause the processor to receive a trigger from the network via network interface 1040. The processor may then initiate a workflow that is associated with the trigger. Initiating the workflow may include causing at least one action to execute and receiving a response indicating when that action has completed. The workflow initiation instructions 1131 are described throughout this description generally, including places such as the description of blocks 1005-1030.

The medium 1130 may include threshold response time exceeded instructions 1131. The threshold response time exceeded instructions 1131 may cause the processor to receive the response time for the action and compare it with the threshold response time. The comparison may also include comparison with other response times, from either this workflow or others, to detect patterns in the response times. The threshold response time exceeded instructions 1131 are described throughout this description generally, including places such as the description of blocks 1035-1065.

The medium 1130 may include propose threshold modification instructions 1133. The propose threshold modification instructions 1133 may cause the processor to propose, to the system administrator, modifications to the response time thresholds. The system administrator may be given an option to change the threshold in accordance with the proposal. The propose threshold modification instructions 1133 are described throughout this description generally, including places such as the description of blocks 1070-1085.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, at a workflow server connected to a network, an electronic indication that a trigger having a trigger type has been detected by a sensor connected to the network, wherein the workflow server is configured to execute an action in a workflow in response to the trigger;
   sending, via the network, an alert to a device associated with a user to request a response from the user, wherein reception of the response is the action in the workflow;
   receiving, via the network from the device, the response from the user;
   detecting that a current response time for the trigger exceeds a threshold response time for the action, wherein the current response time is an amount of time that elapsed between detection of the trigger and receiving the response from the user;
   detecting, based on the current response time and based on previous response times for previous triggers of the trigger type, a pattern that indicates response times for triggers of the trigger type recurrently exceed the threshold response time;
   in response to detecting the pattern, generating a proposed modification to the workflow or to a standard operating procedure (SOP) of an entity for whom the workflow is effectuated; and
   sending, to a system administrator via the network, an electronic message that recommends implementing the proposed modification to effect a change in the pattern.

2. The method of claim 1 further comprising:
receiving, from the user, an indication that the current response time exceeding the threshold is an anomaly; and
skipping the steps of detecting the pattern, generating the proposed modification, and sending the electronic message.

3. The method of claim 2 further comprising:
providing a dashboard for review by the system administrator, the dashboard including the detected pattern and the anomaly indications, wherein the dashboard provides links to allow the system administrator to view the previous response times.

4. The method of claim 1 wherein generating the proposed modification further comprises:
identifying the pattern in a different workflow.

5. The method of claim 1 wherein generating the proposed modification further comprises:
identifying the pattern from a different user.

6. The method of claim 1 wherein generating the proposed modification further comprises:
identifying the pattern from a different entity's workflow.

7. The method of claim 1 further comprising:
receiving an acknowledgement of the proposed modification from the system administrator; and
implementing the proposed modification in the workflow.

8. A system comprising:
a processor; and
a memory coupled to the processor, the memory containing a set of instructions thereon that when executed by the processor cause the processor to:
receive, at a workflow server connected to a network, an electronic indication that a trigger having a trigger type has been detected by a sensor connected to the network, wherein the workflow server is configured to execute an action in a workflow in response to the trigger;
send, via the network, an alert to a device associated with a user to request a response from the user, wherein reception of the response is the action in the workflow;
receive, via the network from the device, the response from the user;
detect that a current response time for the trigger exceeds a threshold response time for the action, wherein the current response time is an amount of time that elapsed between detection of the trigger and receiving the response from the user;
detect, based on the current response time and based on previous response times for previous triggers of the trigger type, a pattern that indicates response times for triggers of the trigger type recurrently exceed the threshold response time;
in response to detecting the pattern, generate a proposed modification to the workflow or to a standard operating procedure (SOP) of an entity for whom the workflow is effectuated; and
send, to a system administrator via the network, an electronic message that recommends implementing the proposed modification to effect a change in the pattern.

9. The system of claim 8 further comprising instructions that cause the processor to:
receive, from the user, an indication that the current response time exceeding the threshold is an anomaly; and
skip the steps of detecting the pattern, generating the proposed modification, and sending the electronic message.

10. The system of claim 9 further comprising instructions to:
provide a dashboard for review by the system administrator, the dashboard including the detected pattern and the anomaly indications, wherein the dashboard provides links to allow the system administrator to view the previous response times.

11. The system of claim 8 wherein the instructions to generate the proposed modification further comprises instructions to:
identify the pattern in a different workflow.

12. The system of claim 8 wherein the instructions to generate the proposed modification further comprises instructions to:
identify the pattern from a different user.

13. The system of claim 8 wherein the instructions to generate the proposed modification further comprises instructions to:
identify the pattern from a different entity's workflow.

14. The system of claim 8 further comprising instructions to:
receive an acknowledgement of the proposed modification from the system administrator; and
implement the proposed modification in the workflow.

15. A non-transitory processor readable medium containing a set of instructions thereon that when executed by a processor cause the processor to:
receive, at a workflow server connected to a network, an electronic indication that a trigger having a trigger type has been detected by a sensor connected to the network, wherein the workflow server is configured to execute an action in a workflow in response to the trigger;
send, via the network, an alert to a device associated with a user to request a response from the user, wherein reception of the response is the action in the workflow;
receive, via the network from the device, the response from the user;
detect that a current response time for the trigger exceeds a threshold response time for the action, wherein the current response time is an amount of time that elapsed between detection of the trigger and receiving the response from the user;
detect, based on the current response time and based on previous response times for previous triggers of the trigger type, a pattern that indicates response times for triggers of the trigger type recurrently exceed the threshold response time;
in response to detecting the pattern, generate a proposed modification to the workflow or to a standard operating procedure (SOP) of an entity for whom the workflow is effectuated; and
send, to a system administrator via the network, an electronic message that recommends implementing the proposed modification to effect a change in the pattern.

16. The non-transitory processor readable medium of claim 15 further comprising instructions that cause the processor to:
receive, from the user, an indication that the current response time exceeding the threshold is an anomaly; and
skip the steps of detecting the pattern, generating the proposed modification, and sending the electronic message.

17. The non-transitory processor readable medium of claim 16 further comprising instructions to:
provide a dashboard for review by the system administrator, the dashboard including the detected pattern and the anomaly indications, wherein the dashboard provides links to allow the system administrator to view the previous response times.

18. The non-transitory processor readable medium of claim 15 wherein the instructions to generate the proposed modification further comprises instructions to:
identify the pattern in a different workflow.

19. The non-transitory processor readable medium of claim 15 wherein the instructions to generate the proposed modification further comprises instructions to:
identify the pattern from a different user.

20. The non-transitory processor readable medium of claim 15 further comprising instructions to:
receive an acknowledgement of the proposed modification from the system administrator; and
implement the proposed modification in the workflow.

\* \* \* \* \*